(12) United States Patent
Suzuki et al.

(10) Patent No.: US 7,514,384 B2
(45) Date of Patent: Apr. 7, 2009

(54) INORGANIC COMPOUND CONTAINING ACTIVE OXYGEN AND PROCESS FOR PRODUCING THE SAME

(75) Inventors: Kenzi Suzuki, Aichi (JP); Satoru Fujita, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 672 days.

(21) Appl. No.: 10/524,833

(22) PCT Filed: Aug. 20, 2003

(86) PCT No.: PCT/JP03/10497

§ 371 (c)(1),
(2), (4) Date: Aug. 4, 2005

(87) PCT Pub. No.: WO2004/018361

PCT Pub. Date: Mar. 4, 2004

(65) Prior Publication Data

US 2006/0045834 A1    Mar. 2, 2006

(30) Foreign Application Priority Data

Aug. 21, 2002  (JP) .............................. 2002-240374
Aug. 27, 2002  (JP) .............................. 2002-246318

(51) Int. Cl.
*B01J 29/06* (2006.01)
*C01B 33/26* (2006.01)

(52) U.S. Cl. .................. 502/60; 423/328.1; 423/328.21

(58) Field of Classification Search .................. 502/60; 423/328.1, 328.2
See application file for complete search history.

(56) References Cited

FOREIGN PATENT DOCUMENTS

JP  2001-058814  3/2001
JP  2002-003218  1/2002
JP  2002-200190  7/2002

OTHER PUBLICATIONS

Fujita, Satoru. "Hydrogarnet ni yoru VOC Gas Bunkai Kassei", Dai 31 Kai Sekiyu-Sekiyu Kagaku Toronkai Koen Yoshi, p. 231 2001, no month.
Fujita, Satoru. "Hydrogrossular o Mochiita VOC Bunkai Kassei (Second report)", Dai 88 Kai Shokubai Toronkai Toronkai A Yokoshu, p. 83 2001, no month.
Kang, Yih-Ming et al. "Effects of acid or base additives on the catalytic combustion activity of chromium and cobalt oxides", Applied Catalysis A: General, vol. 114, pp. 35-49 1994.
Drago, Russell S. et al. "Low-temperature deep oxidation of hydrocarbons by metal oxides supported on carbonaceous materials", Applied Catalysis B: Environmental, vol. 6, pp. 155-168 1995.
Watanabe, Noriko et al. "Removal of unpleasant odor gases using an Ag-Mn catalyst", Applied Catalysis B: Environmental, vol. 8, pp. 405-415 1996.
Fujita, Satoru et al. "Oxidative Destruction of Hydrocarbons on a New Zeolite-like Crystal of Ca12A110Si4O35 Including $O_2$- and $O_2$-2 Radicals", Chem. Mater., vol. 15, pp. 255-263 2003.
Mori, Toshiaki et al. "Preparation of a New Zeolite-like Mayenite and Its Activity for the Decomposition of Volatile Organic Compounds", Book of Abstracts and Recent Research Reports, 14,00-16,00 2002.
Fujita, Satoru et al. "Preparation of high-performance Co3O4 catalyst for hydrocarbon combustion from Co-containing hydrogarnet", Catalysis Letters, vol. 86, No. 1-3, pp. 139-144 2003.
Fujita, Satoru et al. "Dechlorination of Chlorobenzene by Mayenite with Occluding Active Oxygen", Journal of Ecotechnology Research, vol. 8, No. 2, pp. 272-273, with English abstract 2002.
Ohkawa, M. et al. "Crystal structure of Ca12A110Si4O35 including radical anions ($O_2$- and $O_2$-2)", Proceedings of Academic Lecture Meeting of 2000, The Mineralogical Society of Japan, p. 173, with English abstract 2002.
Fujita, S. et al., Proceedings of the 13th Annual Conference of The Japan Society of Waste Management Experts, pp. 697-699, with English abstract 2002.
Suzuki, K. et al. "Aiming to Develop a High Efficiency Device", Materials Integration, vol. 16, No. 1, p. 42, with English abstract 2003.

*Primary Examiner*—Elizabeth D Wood
(74) *Attorney, Agent, or Firm*—Oblon, Spivak, McClelland, Maier & Neustadt, P.C.

(57) ABSTRACT

The present invention relates to an active oxygen developing substance composed of an aluminosilicate obtained by heating hydrogarnet as a precursor substance at 700° C. or higher; an aluminosilicate catalyst supporting cobalt oxide, produced by supporting cobalt oxide on the surface of the aluminosilicate; a method for manufacturing these; and applications of these as oxidation catalysts, solid electrolytes, oxygen occlusion carriers, and so forth.

14 Claims, 15 Drawing Sheets

INORGANIC COMPOUND CONTAINING ACTIVE OXYGEN AND PROCESS FOR PRODUCING THE SAME

TECHNICAL FIELD

This invention relates to a method for manufacturing an inorganic compound including active oxygen, and more particularly relates to a novel active oxygen developing substance including or occluding both a superoxide anion ($O_2^-$) and a peroxide anion ($O_2^{2-}$), and to a method for manufacturing this substance, and applications therefor. Inorganic compounds including or occluding both a superoxide anion and a peroxide anion were not known in the past, but the present invention is useful in that it provides a novel material that includes or occludes both of these.

The active oxygen developing substance of the present invention is useful as a constituent component of oxidation catalysts, solid electrolyte fuel-cell electrodes, antimicrobial agents, ion conductors, and so forth, and a molded article of the active oxygen developing substance of the present invention, is useful in that it provides a new type of exhaust gas purification catalyst for two-wheeled vehicles, a solid electrolyte for secondary cells, an oxygen occlusion carrier, or the like.

The present invention also relates to an aluminosilicate catalyst supporting cobalt oxide, to a method for manufacturing this catalyst, and to applications for this catalyst, and more particularly relates to a new aluminosilicate catalyst supporting cobalt oxide that has more active oxidation capability at lower temperatures than conventional oxidation or combustion catalysts, and to a method for manufacturing this catalyst, to a method for the oxidative decomposition of volatile organic compounds with this catalyst, and so forth. The novel aluminosilicate that is the catalyst component of the present invention has a zeolite-like structure in which active oxygen (superoxide: $O_2^-$, peroxide: $O_2^{2-}$) is encapsulated, and can be used in oxidation reactions of hydrocarbons and the like by means of the active oxygen included in the structure. Examples of such reactions include epoxidation, complete oxidation, partial oxidation, and coupling. When cobalt oxide is supported on this novel aluminosilicate, the result is a catalyst of even higher activity, and the aluminosilicate catalyst supporting cobalt oxide of the present invention can be utilized in a wide range of technological fields dealing with the environment, energy, the chemical industry (manufacturing process), and so forth. Further, a formed or molded article of the aluminosilicate supporting cobalt oxide of the present invention is useful, for example, in that it provides a new type of exhaust gas purification catalyst for two-wheeled vehicles, a solid electrolyte for secondary cells, an oxygen occlusion carrier, or the like.

BACKGROUND ART

As air pollution has worsened around urban centers, standards aimed at significantly cutting back nitrogen oxides, which are a cause of respiratory problems, and hydrocarbons, which are a cause of photochemical smog, have been established by the Central Environment Council of the Ministry of the Environment, as announced in 2004 on the basis of the Air Pollution Control Law. More specifically, exhaust gas restrictions on motorcycles and other two-wheeled vehicles are scheduled to be greatly tightened in 2006-2007 and beyond. As an example of the new standards, it is planned that as of 2006, scooters of 50 cc or smaller must emit no more than 0.5 g of hydrocarbons per kilometer of travel (a reduction of 75% over the current level), and no more than 0.15 g of nitrogen oxides (50% reduction). For motorcycles over 250 cc, it is planned that as of 2007, they must emit no more than 0.3 g of hydrocarbons (85% reduction) and no more than 0.15 g of nitrogen oxides (50% reduction).

Hydrocarbons are emitted as a result of incomplete combustion of gasoline, and their emission by two-wheeled vehicles is more than ten times that by passenger vehicles, accounting for some 20% of the total emissions of four- and two-wheeled vehicles combined. Given this situation, the use of the same catalytic converters in two-wheeled vehicles as those used in passenger vehicles has been studied, but existing catalytic converters would be disproportionately costly on inexpensive two-wheeled vehicles, and a less expensive exhaust gas purification catalyst needs to be developed.

In today's automobile catalytic converters, platinum, palladium, platinum/rhodium, palladium/rhodium, platinum/palladium/rhodium, and the like are supported on a monolithic carrier made from cordierite, and used as a three-way catalytic converter. Further, ceria, which is an oxygen-storing substance, has been used as an auxiliary catalyst in order to absorb fluctuations in the air-fuel ratio. The above noble metals have high catalytic activity, but they are costly, and moreover need to be used in large quantities, so they are recovered and reused.

An example of substances known and put to use in the past as active oxygen developing substances is a photocatalyst typified by titanium oxide. Electrons and holes are formed when light (UV rays) is absorbed by titanium oxide. Because the oxidative strength resulting from holes is greater than the reductive strength resulting from excited electrons with titanium oxide, adsorbed water on the catalyst surface is oxidized by the holes, producing hydroxy radicals (.OH). Meanwhile, a reaction proceeds in which the oxygen in the air is reduced, producing active oxygen ($O_2^-$). It is believed that active oxygen becomes water via hydrogen peroxide ($H_2O_2$) or the formation of a peroxide of an intermediate of the oxidation reaction. There are also cases in which active oxygen acts directly on carbon-carbon bonds and decomposes harmful organic substances.

Another substance known to develop active oxygen is a $12CaO.7Al_2O_3$ compound that encloses active oxygen species (Japanese Laid-Open Patent Application No.2002-3218). This $12CaO.7Al_2O_3$ compound is manufactured from a raw material mixture of calcium and aluminum in an atomic equivalent ratio of 12:14, which are subjected to solid phase reaction in a dry oxidative atmosphere controlled to an oxygen partial pressure of at least $10^4$ Pa, and preferably at least $10^5$ Pa, and a water vapor partial pressure of no more than 1 Pa, and at a high firing temperature of at least 1200° C., and preferably 1300° C. The active oxygen enclosed by a $12CaO.7Al_2O_3$ compound manufactured in an atmosphere in which the oxygen partial pressure and water vapor partial pressure are strictly managed, which requires a large quantity of thermal energy, is $O_2^-$ and/or $O^-$.

However, when it came to this type of active oxygen developing substance, no inorganic compound that would include or occlude both a superoxide anion ($O_2^-$) and a peroxide anion ($O_2^{2-}$) was known up to now, and all that was known was the production of a superoxide with a $12CaO.7Al_2O_3$ compound or a photocatalyst such as the above-mentioned titania.

Furthermore, the release of volatile organic compounds and the like into the atmosphere today is causing serious environmental pollution. Combustion is one way that volatile organic compounds can be removed, but this requires high temperatures over 1000° C. Catalysts are utilized to allow combustion to occur at lower temperatures. The catalysts used for such applications are called combustion catalysts. In the past, oxides of cobalt, copper, manganese, chromium, and the like have been supported on porous alumina, allowing the combustion temperature to be lowered to between 300 and 600° C. (see, for example, (1) Y. M. Kang and B. Z. Wan, *Appl. Cat. A*, Vol. 114 (1994), p. 35, (2) R. S. Drago, K. Jurczyk, D. L. Singh, and V. Young, *Appl. Cat. B*8 (1996), p. 155, and (3) N. Watanabe, H, Yamashita, H. Miyadera, and S. Tominaga, *Appl. Cat. B*8 (1996), p. 405). Today, however, the development of a catalyst with higher activity than conventional catalysts is needed for the sake of energy conservation. Catalysts supporting noble metals such as platinum, palladium, and rhodium have high activity and are commonly used in automobile catalytic converters. Although these noble metals have high catalytic activity, they are also valuable and costly, and are used in large quantities, and therefore are recovered and reused. Hydrocarbons, which are environmental pollutants emitted from internal combustion engines, are emitted as a result of the incomplete combustion of gasoline, and their emission by two-wheeled vehicles is more than ten times that by passenger vehicles, accounting for some 20% of the total emissions of four- and two-wheeled vehicles combined. Given this situation, the use of the same catalytic converters in two-wheeled vehicles as those used in passenger vehicles has been studied, but existing catalytic converters would be disproportionately costly on inexpensive two-wheeled vehicles, and a less expensive exhaust gas purification catalyst that does not make use of noble metals needs to be developed in this field of technology.

DISCLOSURE OF THE INVENTION

In light of the above situation, and the prior art discussed above, the inventors conducted diligent research aimed at developing a novel active oxygen developing substance that would be capable of including or occluding in its structure $O_2^{2-}$ having greater oxidative strength than active oxygen species such as $O_2^-$ and $O^-$ known to be developed by photocatalysts such as titania or by a $12CaO.7Al_2O_3$ compound. As a result, they arrived at the present invention upon discovering that an aluminosilicate expressed by $Ca_{12}(Al_{14-X}Si_X)O_{33+0.5X}$ includes or occludes both a superoxide anion $(O_2^-)$ and a peroxide anion $(O_2^{2-})$.

It is an object of the first aspect of the present invention to provide a novel active oxygen developing substance that includes or occludes both a superoxide anion $(O_2^-)$ and a peroxide anion $(O_2^{2-})$, which are powerful oxidants, and a method for manufacturing the active oxygen developing substance.

It is another object of the present invention to provide a novel active oxygen developing substance wherein active oxygen such as $O_2^{2-}$ is included or occluded in the structure of the substance.

It is another object of the present invention to provide an aluminosilicate which is a novel active oxygen developing substance that includes or occludes both a superoxide anion $(O_2^-)$ and a peroxide anion $(O_2^{2-})$ in its structure.

It is another object of the present invention to produce a formed or molded article of an aluminosilicate which is a novel active oxygen developing substance, and provide a member such as an exhaust gas purification catalyst for two-wheeled vehicles and the like, a solid electrolyte for secondary cells, or an oxygen occlusion carrier.

In the course of further diligent research aimed at developing a catalyst of higher activity in light of the above prior art, the inventors took a close look at hydrogarnet, whereupon they discovered that when it is heated to 350° C. or higher, it changes into an aluminosilicate, and this aluminosilicate includes or occludes active oxygen such as peroxide anions and superoxide anions into its structure. These active oxygens stay in the structure at room temperature, but can move at temperatures over 400° C. Specifically, the active oxygen present in the structure fly out of the structure and induce chemical reactions such as oxidation. The inventors arrived at the present invention upon discovering for the first time that after the active oxygen moves, the oxygen in the air is taken into the structure, regenerating it, and that active oxygen can be supplied continuously and incessantly, and that active oxygen is a powerful oxidant and is extremely effective in the oxidative decomposition or combustion of volatile organic compounds and so forth, and when cobalt oxide, which has long been known as an oxidation catalyst, is supported on an aluminosilicate that develops active oxygen, even higher oxidation capability can be imparted at low temperature.

It is an object of the second aspect of the present invention to develop and provide a catalyst with higher activity than conventional oxidation or combustion catalysts, and to provide a method for manufacturing this catalyst. It is a further object of the present invention to create a molded article of an aluminosilicate supporting cobalt oxide, and provide an exhaust gas purification catalyst for two-wheeled vehicles and the like, a combustion exhaust gas purification catalyst, an oxygen occlusion member, or the like.

The first aspect of the present invention will now be described in further detail.

The method of the present invention for manufacturing a novel active oxygen developing substance does not require control of the oxygen partial pressure or water vapor partial pressure, and the heating may be at a relatively low temperature of 1000° C or lower. An example of this manufacture will now be given, but the method of the present invention for manufacturing a novel active oxygen developing substance is not limited to just the following method. The active oxygen developing substance of the present invention is manufactured by using hydrogarnet as a precursor substance, and heating it to at least 700° C. in an electric furnace or the like under an air atmosphere. The chemical compositional formula of the hydrogarnet used as the precursor is $Ca_3Al_2(SiO_4)_{3-Y}(OH)_{4Y}$, where the value of Y is in the range of $0 \leq Y < 3$.

Meanwhile, the chemical compositional formula of the aluminosilicate having a novel active oxygen developing function is $Ca_{12}(Al_{14-X}Si_X)O_{33+0.5X}$, where the value of X is in the range of $0 < X \leq 4$. The chemical composition when X=4 is $Ca_{12}(Al_{10}Si_4)O_{35}$, and when $Ca_{12}(Al_{10}Si_4)O_{35}$ is synthesized, the composition of the precursor hydrogarnet is $Ca_3Al_2(SiO_4)_{0.8}(OH)_{8.8}$ (Y=2.2). The hydrogarnet is synthesized as follows. First, a calcia source, an alumina source, and a silica source are mixed so as to match the hydrogarnet composition, that is, the composition of hydrogarnet with the desired Y value, and an excess of water is added to this to prepare a mixture.

The calcia source here can be slaked lime, unslaked lime, calcium carbonate, gypsum, or the like; the alumina source can be kaolin, alumina sol, boehmite, aluminum hydroxide, aluminum oxide, or the like; and the silica source can be kaolin, silica, amorphous silica, diatomaceous earth, silica sand, quartz, or the like. The prepared mixture is subjected to a wet heat treatment in an autoclave for at least 5 hours at a temperature of from 100 to 200° C. to synthesize hydrogarnet. The reaction will not proceed adequately if the temperature is below 100° C., but too much thermal energy will be consumed if the temperature is over 200° C. The heating time can be shorter than 5 hours, but at least 5 hours is preferable in order to obtain hydrogarnet with good crystallinity.

An aluminosilicate that is a novel active oxygen developing substance can be obtained by heating hydrogarnet to 700° C. or higher and 1200° C. or lower in an air atmosphere. Heating at a temperature under 700° C. is undesirable because pyrolysis will be inadequate. The heating may be performed at an even higher temperature, but this will consume too much thermal energy, so the limit is set at 1200° C. or lower. An aluminosilicate that is the novel active oxygen developing substance of the present invention can be obtained by heating hydrogarnet synthesized by the above method. Cases in which X=4 and X=2 are given below as examples.

The compositional formula of the precursor hydrogarnet used to synthesize $Ca_{12}Al_{10}Si_4O_{35}$ (X=4) is $Ca_3Al_2(SiO_4)_{0.8}(OH)_{8.8}$ (Y=2.2), and the pyrolysis thereof that occurs at 700° C. is expressed as follows.

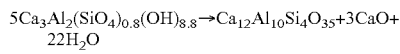

The compositional formula of the precursor hydrogarnet used to synthesize $Ca_{12}Al_{12}Si_2O_{34}$ (X=2) is $Ca_3Al_2(SiO_4)_{1/3}(OH)_{32/3}$ (Y=8/3), and the pyrolysis thereof that occurs at 700° C. is expressed as follows.

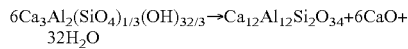

The $Ca_{12}Al_{10}Si_4O_{35}$, $Ca_{12}Al_{12}Si_2O_{34}$, and so forth obtained from the above reaction formulas are examples of aluminosilicates that are the novel active oxygen developing substance of the present invention. The novel active oxygen developing substance of the present invention is obtained within the range of $0<X\leq4$, and is produced by the pyrolysis of hydrogarnet, which is a precursor thereof. As can be seen from the pyrolysis formulas, unslaked lime (CaO) is admixed as a by-product, but unslaked lime does not participate in the development or inclusion of active oxygen. CaO can be easily removed by dissolving it with a dilute acid such as hydrochloric acid or nitric acid.

ESR measurement and Raman spectroscopy are two ways to check whether or not the hydrogarnet pyrolyzate, that is, the aluminosilicate that is the novel active oxygen developing substance, includes or occludes active oxygen such as superoxide anions ($O_2^-$) and peroxide anions ($O_2^{2-}$). For instance, the results of ESR and Raman spectroscopy at room temperature for the $Ca_{12}Al_{10}Si_4O_{35}$ used in the working examples given below will now be described. First, FIG. 1 shows the ESR measurement results. The spectrum appearing at $g_1=2.049$ mT indicates the presence of superoxide anions. FIG. 2 shows the results of Raman spectroscopy at room temperature. Just as in ESR measurement, the presence of superoxide anions is confirmed from a peak at 1075 cm$^{-1}$.

The results in both FIGS. 1 and 2 tell us that $Ca_{12}Al_{10}Si_4O_{35}$ is included or occluded in the structure of the superoxide anions. Furthermore, Raman spectroscopy results for $Ca_{12}Al_{10}Si_4O_{35}$ reveal a distinct peak at 853 cm$^{-1}$ as well as at 1075 cm$^{-1}$. The former corresponds to a peak originating in peroxide anions, and the latter in superoxide anions. The above results lead to the conclusion that the novel active oxygen developing substance of the present invention includes or occludes superoxide anions and peroxide anions in its structure.

FIG. 3 shows the crystal structure of $Ca_{12}Al_{10}Si_4O_{35}$. The structure of $Ca_{12}Al_{10}Si_4O_{35}$ is a cubic system, with a lattice constant of a=12.0116 Å, and a space group of I$^-$43d. This is a zeolite-like structure in which (Al,Si)O$_4$ tetrahedra are formed in the form of a framework, and active oxygen $O_2^-$ and $O_2^{2-}$ are present in the voids (spaces of about 4 Å) in this framework.

The active oxygen included or occluded by the aluminosilicate that is the novel active oxygen developing substance of the present invention is a powerful oxidant, is discharged from within the structure when heated to 400° C. or higher, and participates in chemical reactions and so forth. In other words, the active oxygen included or occluded by the aluminosilicate that is the novel active oxygen developing substance of the present invention is able to move at a temperature of 400° C. or higher. For instance, the novel active oxygen developing substance has the ability to completely oxidize and decompose volatile organic compounds (VOCs) into $CO_2$ or $H_2O$ at a low temperature of 400 to 600° C. Because of this, the active oxygen developing substance of the present invention can be used as the active component of an oxidation catalyst.

The active oxygen in the structure is gradually consumed as an oxidative decomposition reaction continues under an oxygen-free atmosphere, and if the reaction continues long enough, the active oxygen is completely used up, after which no more is supplied. However, if air or oxygen is supplied to the novel active oxygen developing substance after active oxygen ceases to be supplied, active oxygen will be produced again in the structure and the powerful oxidizing action will be restored. This is a distinctive feature of this substance. FIG. 4 shows experimental results. Therefore, if air or oxygen is continually supplied during the oxidative decomposition of VOCs and the like, the supply of active oxygen from the novel active oxygen developing substance will never run out.

Because superoxide anions and peroxide anions both have a powerful oxidizing action, they are able to decompose VOCs and other harmful chemical substances, and hold promise in applications such as the oxidative decomposition of these harmful chemical substances in the environmental field. Furthermore, the consumed active oxygen (superoxide anions and peroxide anions) is regenerated in the structure of the novel active oxygen developing substance of the present invention, and therefore this substance has the advantage that it can be used indefinitely.

The novel active oxygen developing substance of the present invention having the above advantages can be obtained as a powder in its manufacturing method. In addition to utilizing this substance as a powder, many other conveniences and new functions as a molded article will likely be realized. The form of the molded article will be determined by the intended use, and the molding method can be any one that is used in the manufacture of molded ceramics. Possible forms of the molded article include granules, a sheet, a rod, a tube, hollow fibers, a monolith, and a honeycomb, and examples of molding methods include casting, press molding, dry CIP molding, injection molding, and sheet molding. Naturally, whether the molded article will be solid or porous is taken into account along with the desired form in molding. As an example, of the various molded articles that are possible, the following is a description of the oxidation catalyst function of samples in the form of pellets and sheets.

FIG. 5 is a simplified view of the measurement apparatus used to examine the oxidation catalyst performance of the substance of the present invention. This apparatus consists of (1) a gas supply unit, (2) a heating unit, and (3) a gas analysis unit. The gas supply unit supplies the hydrocarbons to be subjected to oxidative decomposition, and the air or oxygen used as a combustion auxiliary. The heating unit heats a reaction tube filled with the sample to a specific temperature. The gas analysis unit analyzes the composition of the supply gas that has passed through the sample. The reaction tube is modified according to the form of the sample, and FIG. 6 shows a simplified example thereof. For a sample in the form of a powder, pellets, or granules (4), the center of a silica glass reaction tube (5) is packed with the sample, and the ends of the sample are held in place with rock wool (6). For a sample in the form of a sheet (7), the ends of the sheet are held in place with silica glass tubes (8) via a sealant, and the silica glass tubes are fixed to the sample sheet.

The oxidation catalyst function of a powder and a molded article was examined for propylene, benzene, and methane, which revealed that all of these hydrocarbons are decomposed at a temperature of 400° C. or higher.

The function of the novel active oxygen developing substance of the present invention as an ion conductor will also be described. A conductive material and a binder were mixed into $Ca_{12}(Al_{14-X}Si_X)O_{33+0.5X}$ (the powdered substance of the present invention; $0<X\leq4$) to prepare a mix in the form of a paste, and this was use to coat the surface of an aluminum foil collector to produce an electrode. The conductive material is used to ensure electrical conductivity, and can be, for example, carbon black, acetylene black, graphite, or the like, either singly or in mixtures of two or more materials. The binder is used to bind the conductive material particles together with the powdered substance of the present invention, and can be, for example, Teflon®, polytetrafluoroethylene, polyvinylidene fluoride, or a fluororubber. An electrode coated with the substance of the present invention is disposed across from a metallic lithium with a separator (nonwoven cloth) in between. For instance, a constant current of 0.1 mA/cm² was allowed to flow for a specific length of time up to 4.5 V between the metallic lithium and the electrode in an organic solvent containing a lithium salt, after which the substance of the present invention was recovered and washed and its composition examined and found to be $Li_yCa_{12}(Al_{14-X}Si_X)O_{33+0.5X}$ (where $0<y\leq30$), which confirmed that the substance of the present invention had the characteristics of lithium ions being inserted.

The present invention relates to an aluminosilicate having a zeolite-like structure in which active oxygen (superoxide: $O_2^-$, peroxide: $O_2^{2-}$) is encapsulated, and more specifically, to a novel active oxygen developing substance and a molded article thereof. The effects of the present invention are (1) the active oxygen included or occluded in the structure produces a hydrocarbon oxidation reaction (such as epoxidation, complete oxidation, partial oxidation, and coupling), and the novel aluminosilicate catalyst supporting cobalt oxide of the present invention can be utilized in a wide range of technological fields dealing with the environment, energy, the chemical industry (manufacturing process), and so forth, and (2) the molded inorganic compound of the present invention is useful, for example, as an exhaust gas purification catalyst for two-wheeled vehicles, a solid electrolyte for secondary cells, an oxygen occlusion carrier, and so on.

The second aspect of the present invention will now be described in further detail.

The novel catalyst of the present invention can be produced by using an aluminosilicate as a support, and supporting microparticles of cobalt oxide on the surface of this aluminosilicate. This aluminosilicate has a compositional formula of $Ca_{12}(Al_{14-X}Si_X)O_{33+0.5X}$, and the value of X in the compositional formula is in the range of $0\leq X\leq4$. An example of the supporting method is to immersion the aluminosilicate in a cobalt nitrite aqueous solution and perform evaporative drying. When the powdered substance thus obtained is heated to 600° C. or higher, the cobalt nitrate supported on the aluminosilicate surface decomposes into cobalt oxide, creating an aluminosilicate catalyst supporting cobalt oxide. With the method of the present invention, nickel oxide, iron oxide, or another metal oxide can be used instead of cobalt oxide, for example.

Further, the novel catalyst of the present invention is obtained by synthesizing cobalt-containing hydrogarnet as a precursor substance by a wet heat method, and heating this product at 300° C. or higher. The chemical composition thereof is expressed by $(Ca_{3-Y}Co_Y)Al_2(SiO_4)_{3-Z}(OH)_{4Z}$. The novel catalyst of the present invention is characterized in that the Y value in the compositional formula is in the range of $0<Y\leq0.10$, and Z in the range of $0\leq Z\leq2.2$. The novel catalyst of the present invention can be utilized as an oxidation catalyst or the like.

The aluminosilicate catalyst supporting cobalt oxide of the present invention is manufactured by synthesizing a cobalt-containing hydrogarnet in which some of the $Ca^{2+}$ ions (a constituent element of hydrogarnet) have been replaced with $Co^{2+}$ ions, and then heating and decomposing this product. To facilitate an understanding of the following description, hydrogarnet itself will first be described. Hydrogarnet has a garnet structure, and its compositional formula is $Ca_3Al_2(SiO_4)_{3-Y}(OH)_{4Y}$. The value of Y here is in the range of $0\leq Y\leq3$. The compositional formula of hydrogarnet varies with the Y value. For instance, the formula is $Ca_3Al_2(SiO_4)_3$ when $Y=0$, $Ca_3Al_2(SiO_4)_{1.5}(OH)_6$ when $Y=1.5$, $Ca_3Al_2(SiO_4)_{0.8}(OH)_{8.8}$ when $Y=2.2$, and $Ca_3Al_2(OH)_{12}$ when $Y=3$. The $Ca^{2+}$ ions in the hydrogarnet structure can be substituted with other cations of similar ion radius, such as $Co^{2+}$ ions.

The radius of $Ca^{2+}$ and $Co^{2+}$ ions is 0.112 and 0.090 nm, respectively, with the latter being slightly smaller. Therefore, when $Ca^{2+}$ ions are substituted with $Co^{2+}$ ions, the lattice constant of the hydrogarnet becomes somewhat smaller. There is a limit to the amount of substitution of $Ca^{2+}$ ions versus $Co^{2+}$ ions, and when this limit was calculated experimentally, it was found to be Co/Ca=0.0344 (=0.10/2.90 molar ratio). When the Co/Ca molar ratio is 0.0344, the compositional formula of hydrogarnet is $(Ca_{2.9}Co_{0.1})Al_2(SiO_4)_{3-Y}(OH)_{4Y}$. The added amount of cobalt may be increased, but as discussed below, this decreases catalyst activity, so it is better not to add too much cobalt (so that the Co/Ca molar ratio would be over 0.0344).

The method for manufacturing the aluminosilicate catalyst supporting cobalt oxide of the present invention will now be described, but this is not intended to limit the method for manufacturing the aluminosilicate catalyst supporting cobalt oxide of the present invention. The cobalt-containing hydrogarnet used as a precursor of the aluminosilicate catalyst supporting cobalt oxide is prepared as follows. First, a cobalt source, a calcia source, an alumina source, and a silica source are mixed so as to match the hydrogarnet composition, that is, the composition of cobalt-containing hydrogarnet with the desired X and Y values, and an excess of water is added to this to prepare a mixture. The cobalt source here can be cobalt hydroxide, cobalt oxide, or the like; the calcia source can be slaked lime, unslaked lime, calcium carbonate, gypsum, or the like; the alumina source can be kaolin, alumina sol, boehmite, aluminum hydroxide, aluminum oxide, or the like; and the silica source can be kaolin, silica, amorphous silica, diatomaceous earth, silica sand, quartz, or the like. These are not the only sources that can be used, however, and any that have the same effect as these can also be used. The combined amount of cobalt and calcium is set to be "3" in the compositional formula $(Ca_{3-X}Co_X)Al_2(SiO_4)_{3-Y}(OH)_{4Y}$. Preferably, the range is $0<X\leq0.10$. The Y value is preferably in the range of $0\leq Y\leq2.2$.

The prepared mixture is subjected to a wet heat treatment in an autoclave for at least 5 hours at a temperature of from 100 to 200° C. to synthesize cobalt-containing hydrogarnet. The reaction will not proceed adequately if the temperature is below 100° C., but too much thermal energy will be consumed if the temperature is over 200° C., so 100 to 200° C. is the preferred range. The heating time can be shorter than 5 hours, but at least 5 hours is preferable in order to obtain cobalt-containing hydrogarnet with good crystallinity. Further, an aluminosilicate catalyst supporting cobalt oxide in which the cobalt oxide is highly dispersed can be manufactured by heating the cobalt-containing hydrogarnet to between 300° C. and 1000° C. in an air atmosphere. The decomposition of the cobalt-containing hydrogarnet will be inadequate if the heating is at a temperature below 300° C., and while the heating may be performed at a temperature over 1000° C., this is undesirable from the standpoint of conserving energy.

The ion used for substitution need not be limited to cobalt, and any other ion that can be substituted may be used instead.

It is well known that a high-performance catalyst in which the catalyst particles are highly dispersed can be synthesized by substituting metal ions in the crystal structure and pyrolyzing. This catalyst manufacturing method is a proven technology in the case of using a layered double hydroxide (LDH) as a catalyst precursor (see, for example, F. Cavani, F. Trifiro, and A. Vaccari, *Catal. Today*, Vol. 11 (1991), p. 173; B. Chen and J. L. Falconer, *J. Catal.*, Vol. 144 (1993), p. 214; S. Velu, R. Veda, A. Ramani, B. M. Chenda, and S. Sivasanker, *Chem. Commun.* (1997), p. 2107; S. Velu, K. Suzuki, M. P. Kapoor, F. Ohashi, and T. Osaki, *Appl. Catal. A*, Vol. 213 (2001), p. 47; and S. Velu, K. Suzuki, and T. Osaki, *Catal. Let.*, Vol. 69 (2000), p. 43), but the inventors of the present invention are the first to discover the catalyst of the present invention in which a cobalt-containing hydrogarnet having a garnet structure is used as a catalyst precursor, and the method for manufacturing this substance.

Next, the amount of $Co^{2+}$ ions that can be substituted in this hydrogarnet with the method of the present invention will be described, using as an example a hydrogarnet in which Y=2.2. FIG. 8 shows the XRD results for cobalt-containing hydrogarnet synthesized by the above method, with the Co/Ca ratio varied from 0 to 0.0714. In FIG. 8, the white circles are the diffraction peaks originating in hydrogarnet $(Ca_3Al_2(SiO_4)_{0.8}(OH)_{8.8})$, the black circles are those originating in cobalt-containing hydrogarnet $((Ca_{3-X}Co_X)Al_2(SiO_4)_{0.8}(OH)_{8.8})$, and the triangles are those originating in cobalt oxide $(Co_3O_4)$. Hydrogarnet alone was synthesized for the sample with no added cobalt (Co/Ca=0). It was confirmed that when some of the calcium was substituted with cobalt (Co/Ca=0.0169), the lattice constant was smaller, so the diffraction line angle shifted higher, producing cobalt-containing hydrogarnet. When the amount of added cobalt was increased to Co/Ca=0.0380, there was precipitation of cobalt oxide that could not be substituted.

Therefore, the limit to the amount of cobalt that can be substituted is Co/Ca=0.0344. As mentioned above, the compositional formula here is $(Ca_{2.9}Co_{0.1})Al_2(SiO_4)_{0.8}(OH)_{8.8}$. The results in FIG. 8 were used to plot the graph of FIG. 9, which shows the relationship between lattice constant and Co/Ca ratio. Up to a Co/Ca ratio of 0.0344, the lattice constant steadily decreases from 1.2408 nm to 1.2313 nm, after which it remains at 1.2313 nm until the Co/Ca ratio is 0.0714. This means that all of the $Co^{2+}$ ions added are being used in substitution up to a Co/Ca ratio of 0.0344, and that beyond this ratio (that is, when the Co/Ca ratio is over 0.0344), no substitution is being performed. The above results are compiled in Table 1.

TABLE 1

Lattice constants of cobalt-containing hydrogarnet
$[(Ca_{3-X}Co_X)Al_2(SiO_4)_{0.8}(OH)_{8.8}: 0 \leq X \leq 0.10]$

| Co/Ca | X | Compositional formula | a/nm | V/nm³ |
|---|---|---|---|---|
| 0 | 0 | $Ca_3Al_2(SiO_4)_{0.8}(OH)_{8.8}$ | 1.24078(15) | 1.910 |
| 0.0101 | 0.03 | $(Ca_{2.97}Co_{0.03})Al_2(SiO_4)_{0.8}(OH)_{8.8}$ | 1.23563(6) | 1.886 |
| 0.0169 | 0.05 | $(Ca_{2.95}Co_{0.05})Al_2(SiO_4)_{0.8}(OH)_{8.8}$ | 1.23263(6) | 1.872 |
| 0.0204 | 0.06 | $(Ca_{2.94}Co_{0.06})Al_2(SiO_4)_{0.8}(OH)_{8.8}$ | 1.23231(7) | 1.871 |
| 0.0238 | 0.07 | $(Ca_{2.93}Co_{0.07})Al_2(SiO_4)_{0.8}(OH)_{8.8}$ | 1.23196(6) | 1.869 |
| 0.0273 | 0.08 | $(Ca_{2.92}Co_{0.08})Al_2(SiO_4)_{0.8}(OH)_{8.8}$ | 1.23162(12) | 1.868 |
| 0.0309 | 0.09 | $(Ca_{2.91}Co_{0.09})Al_2(SiO_4)_{0.8}(OH)_{8.8}$ | 1.23141(13) | 1.867 |
| 0.0344 | 0.10 | $(Ca_{2.90}Co_{0.10})Al_2(SiO_4)_{0.8}(OH)_{8.8}$ | 1.23131(10) | 1.866 |

The relationship between the products and the heating temperature was further examined by XRD for $(Ca_{2.9}Co_{0.1})Al_2(SiO_4)_{0.8}(OH)_{8.8}$, which revealed that there was no change (remained as $(Ca_{2.9}Co_{0.1})Al_2(SiO_4)_{0.8}(OH)_{8.8}$) from room temperature up to 300° C., but heating at 350° C. resulted in a change into aluminosilicate hydroxide $(Ca_{12}Al_{10}Si_4O_{32}(OH)_6)$, unslaked lime (CaO), and cobalt oxide $(Co_3O_4)$. The products of heating at over 350° C. were aluminosilicate hydroxide, unslaked lime, and cobalt oxide in every case. When the heating was performed at over 700° C., the aluminosilicate hydroxide was further dehydrated into anhydrous aluminosilicate $(Ca_{12}Al_{10}Si_4O_{35})$.

Table 2 shows the specific surface area and the cobalt oxide particle size when four types of cobalt-containing hydrogarnet were synthesized with different Co/Ca ratios of 0.0169, 0.0238, 0.0344, and 0.0714, and then heated at 400° C. The specific surface area was at its maximum of 6.5 m²/g when the hydrogarnet had a Co/Ca ratio of 0.0344, and was about 2 to 3 m²/g with other hydrogarnets. Meanwhile, the cobalt oxide particle size was substantially the same as the 250 to 275 Å of cobalt-containing hydrogarnet with a Ca/Co ratio of from 0.0169 to 0.0344, and increased to 850 Å at Co/Ca=0.0714. A larger cobalt oxide particle size is undesirable because it leads to a decrease in dispersibility, that is, a decrease in catalyst activity, so the particle size of the cobalt oxide needs to be as small as possible.

TABLE 2

Specific surface area and cobalt oxide particle size of four types of cobalt-containing hydrogarnet (with different Co/Ca ratios of 0.0169, 0.0238, 0.0344, and 0.0714) after heating at 400° C.

| Co/Ca | 0.0169 | 0.0238 | 0.0344 | 0.0714 |
|---|---|---|---|---|
| X | 0.05 | 0.07 | 0.10 | — |
| Specific surface area ($m^2/g$) | 1.9 | 2.8 | 6.5 | 2.9 |
| $Co_3O_4$ particle size (Å) | 250 | 260 | 275 | 850 |

Table 3 shows the relationship of specific surface area and cobalt oxide particle size to the heating temperature of cobalt-containing hydrogarnet with a Co/Ca ratio of 0.0344. The specific surface area was roughly the same (5.7 and 6.5 $m^2/g$) after heating at 350 and 400° C., but decreased steadily after heating at 450° C. and above. Meanwhile, the cobalt oxide particle size was roughly the same (260 and 275 Å) after heating at 350 and 400° C., but increased steadily from 447 Å after heating at 450° C. and above. The above results indicate that a Co/Ca ratio of 0.0344 and a heating temperature of 400° C. or lower are preferable for manufacturing an aluminosilicate catalyst supporting cobalt oxide.

TABLE 3

Specific surface area, cobalt oxide particle size, and heating temperature of cobalt-containing hydrogarnet with Co/Ca of 0.0344.

| Heating temp. (° C.) | 350 | 400 | 450 | 500 | 600 |
|---|---|---|---|---|---|
| Specific surface area ($m^2/g$) | 5.7 | 6.5 | 4.2 | 3.5 | 2.4 |
| $Co_3O_4$ particle size (Å) | 260 | 275 | 447 | 489 | 856 |

We will now describe the method for examining the catalytic activity of the aluminosilicate catalyst supporting cobalt oxide. The reaction apparatus was a normal pressure, compact, fixed bed, flow through type. The catalyst particle size was 300 to 500 μm, the reaction temperature was from room temperature to 500° C., three types of reaction gas (propylene, benzene, and toluene) were used, the reaction gas concentration was 1000 ppm, the flow-through gas was air, the gas flux was 100 mL/min, the space velocity was 10,000 $h^{-1}$, and gas analysis was performed by gas chromatography (packing material: Porapak P, 5A molsieve, activated carbon, column: 2 m×3). FIG. 10 shows the relationship between the Co/Ca ratio, the specific surface area, and the decomposition rate of each gas (propylene, benzene, and toluene) when using an aluminosilicate catalyst supporting cobalt oxide and manufactured by heating at 400° C. The decomposition rate was found to be closely correlated to the specific surface area, and with all the reaction gases, the maximum decomposition rate was exhibited with a catalyst whose Co/Ca ratio was 0.0344 (($Ca_{2.9}Co_{0.1}$)$Al_2$($SiO_4$)$_{0.8}$($OH$)$_{8.8}$).

FIG. 11 shows the results of subjecting propylene to oxidative decomposition at various reaction temperatures using ($Ca_{2.9}Co_{0.1}$)$Al_2$($SiO_4$)$_{0.8}$($OH$)$_{8.8}$ as the catalyst. The decomposition rate was 2% at a reaction temperature of 200° C., but the decomposition rate rose along with temperature, reaching 100% at 325° C. The product after decomposition was only $CO_2$. $H_2O$ was produced, but was not analyzed. Meanwhile, with a catalyst not substituted with cobalt, that is, just an aluminosilicate, the decomposition rate was zero at a reaction temperature of 325° C., was 2% at 400° C., and reached 100% at 625° C. When a self-combustion experiment was conducted without using a catalyst, propylene began burning only when heated to at least 600° C. The above results mean that it is possible to lower the combustion temperature by using an aluminosilicate as a catalyst, and that the catalytic activity of an aluminosilicate increases by about 200° C. when part of its calcium is substituted with cobalt, and the present invention makes it possible to realize even lower temperatures in these oxidative decomposition reactions. The catalyst of the present invention is useful as an oxidation catalyst for the oxidative decomposition of volatile organic compounds, hydrocarbons, and other such materials to be treated.

An aluminosilicate catalyst supporting cobalt oxide that has the above features can be obtained as a powder in the manufacturing method thereof. In addition to utilizing this substance as a powder, many other conveniences and new functions as a molded article will likely be realized. The form of the molded article will be determined by the intended use, and the molding method can be any one that is used in the manufacture of molded ceramics. Possible forms of the molded article include pellets, granules, a sheet, a rod, a tube, hollow fibers, a monolith, and a honeycomb, and examples of molding methods include casting, press molding, dry CIP molding, injection molding, and sheet molding. Naturally, whether the molded article will be solid or porous is taken into account along with the desired form in molding.

FIG. 12 is a simplified view of an example of the measurement apparatus used to examine the oxidation catalyst performance of the substance of the present invention. This apparatus consists of (1) a gas supply unit, (2) a heating unit, and (3) a gas analysis unit. The gas supply unit supplies the hydrocarbons to be subjected to oxidative decomposition, and the air or oxygen used as a combustion auxiliary. The heating unit heats a reaction tube filled with the sample to a specific temperature. The gas analysis unit analyzes the composition of the supply gas that has passed through the sample. The reaction tube is modified according to the form of the sample, and FIG. 13 shows a simplified example thereof. For a sample in the form of a powder, pellets, or granules (4), the center of a silica glass reaction tube (5) is packed with the sample, and the ends of the sample are held in place with rock wool (6). For a sample in the form of a sheet (7), the ends of the sheet are held in place with silica glass tubes (8) via a sealant, and the silica glass tubes are fixed to the sample sheet.

The function of an aluminosilicate catalyst supporting cobalt oxide that is in the form of a molded article was examined for propylene, benzene, and toluene, for example, which revealed that all of these hydrocarbons are decomposed at a temperature of 200° C. or higher. The decomposition rate thereof was comparable to that with a powder.

The present invention relates to an aluminosilicate catalyst supporting cobalt oxide, and to a method for manufacturing this catalyst, and with the present invention, 1) it is possible to provide a catalyst with higher activity than conventional oxidation or combustion catalysts, 2) higher oxidation capability can be achieved at lower temperatures than with conventional catalysts, 3) an aluminosilicate catalyst supporting cobalt oxide can be manufactured by a simple process under lower temperature conditions (at least 300° C. and no higher than 1000° C.), and 4) this catalyst is useful as a way to oxidatively decompose volatile organic compounds and the like.

Figure 5:
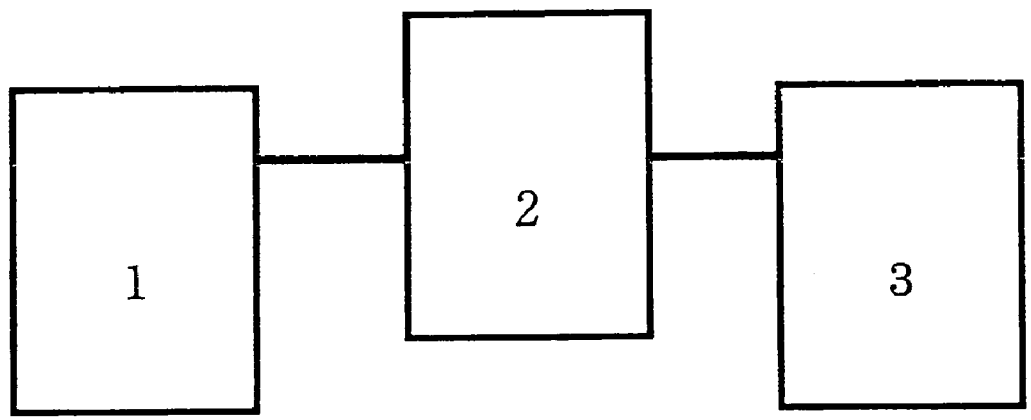
FIG. 5 is a simplified view of the measurement apparatus used to examine the oxidation catalyst performance.
Figure 6:
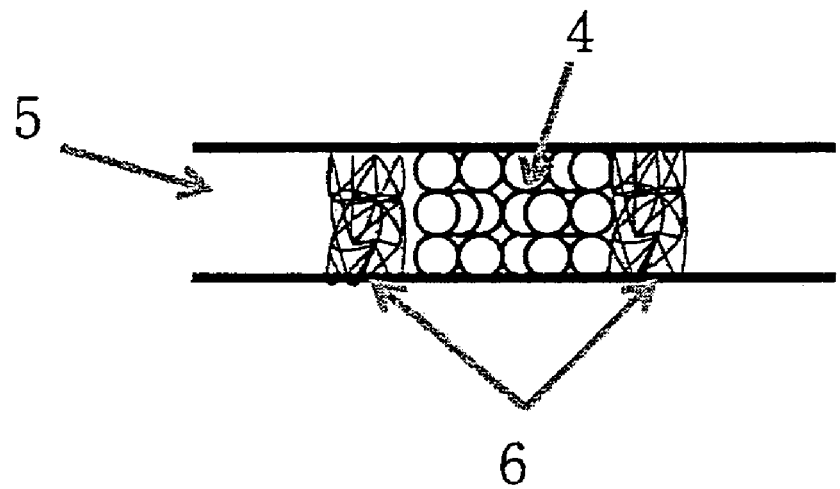
FIG. 6 shows a simplified diagram of the shape of the reaction tube.
Figure 6:
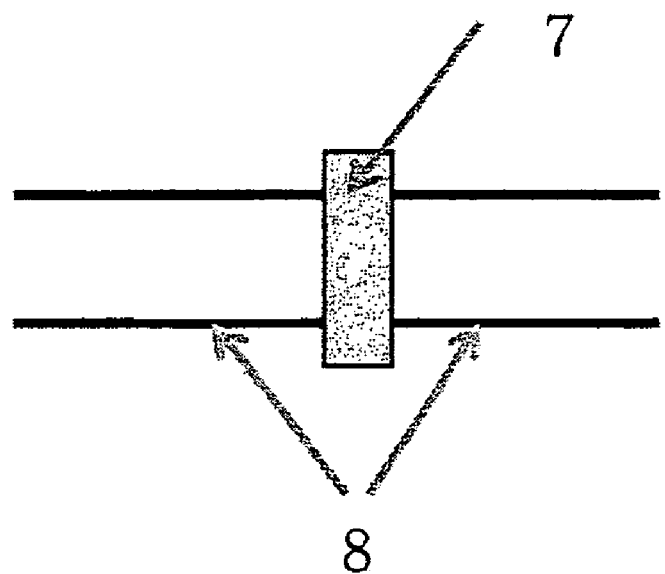
Figure 12:
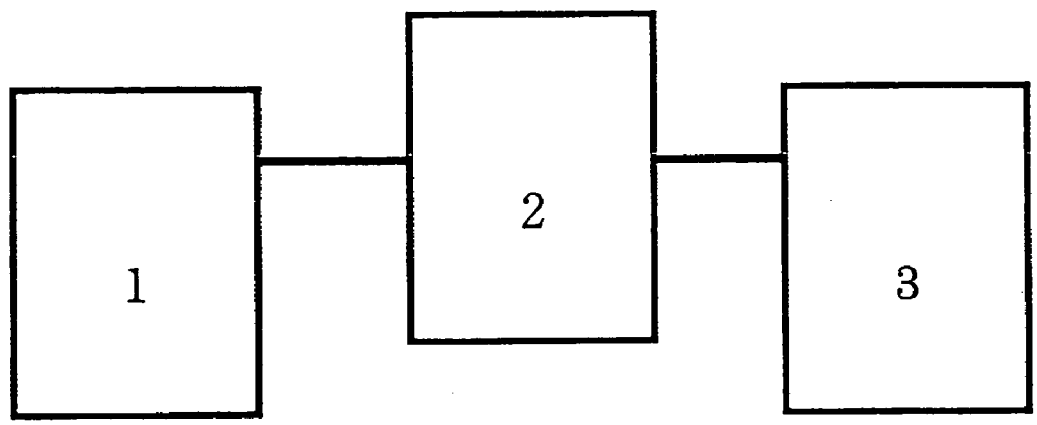
FIG. 12 is a simplified view of the measurement apparatus used to examine the oxidation catalyst performance.
Figure 13:
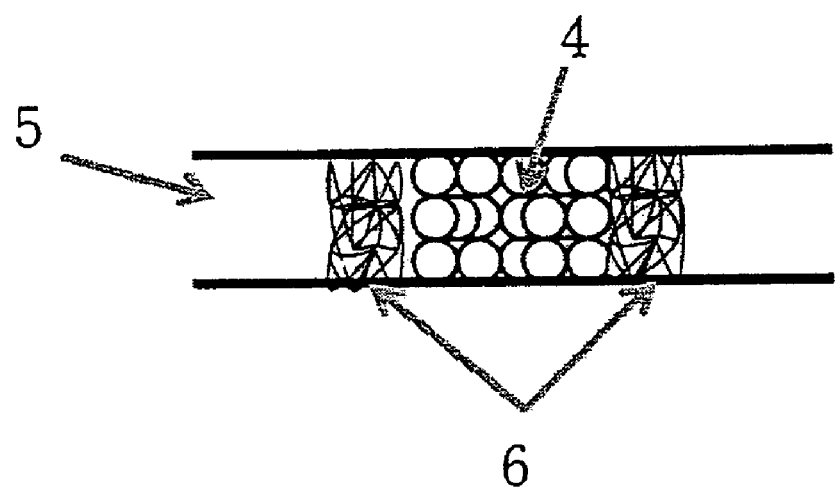
FIG. 13 shows a simplified diagram of the shape of the reaction tube.
Figure 13:
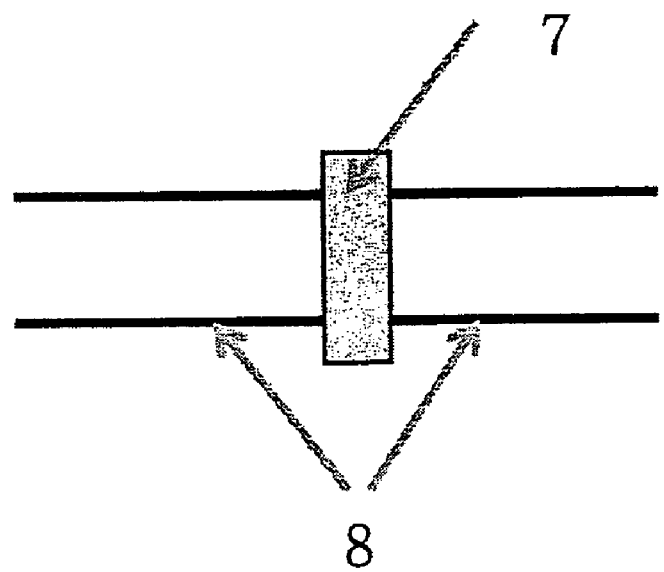

LIST OF ELEMENTS (FIG. 5)
1 gas supply unit
2 heating unit
3 gas analysis unit
(FIG. 6)
4 sample in the form of powder, pellets, or granules
5 silica glass reaction tube
6 rock wool
7 sheet-form sample
8 silica glass tube
(FIG. 12)
1 gas supply unit
2 heating unit
3 gas analysis unit
(FIG. 13)
4 sample in the form of powder, pellets, or granules
5 silica glass reaction tube
6 rock wool
7 sheet-form sample
8 silica glass tube

BEST MODE FOR SUPPORTING OUT THE INVENTION

The first aspect of the present invention will now be described in specific terms by giving examples, but the present invention is not limited in any way by the following examples.

EXAMPLE 1

Figure 1:
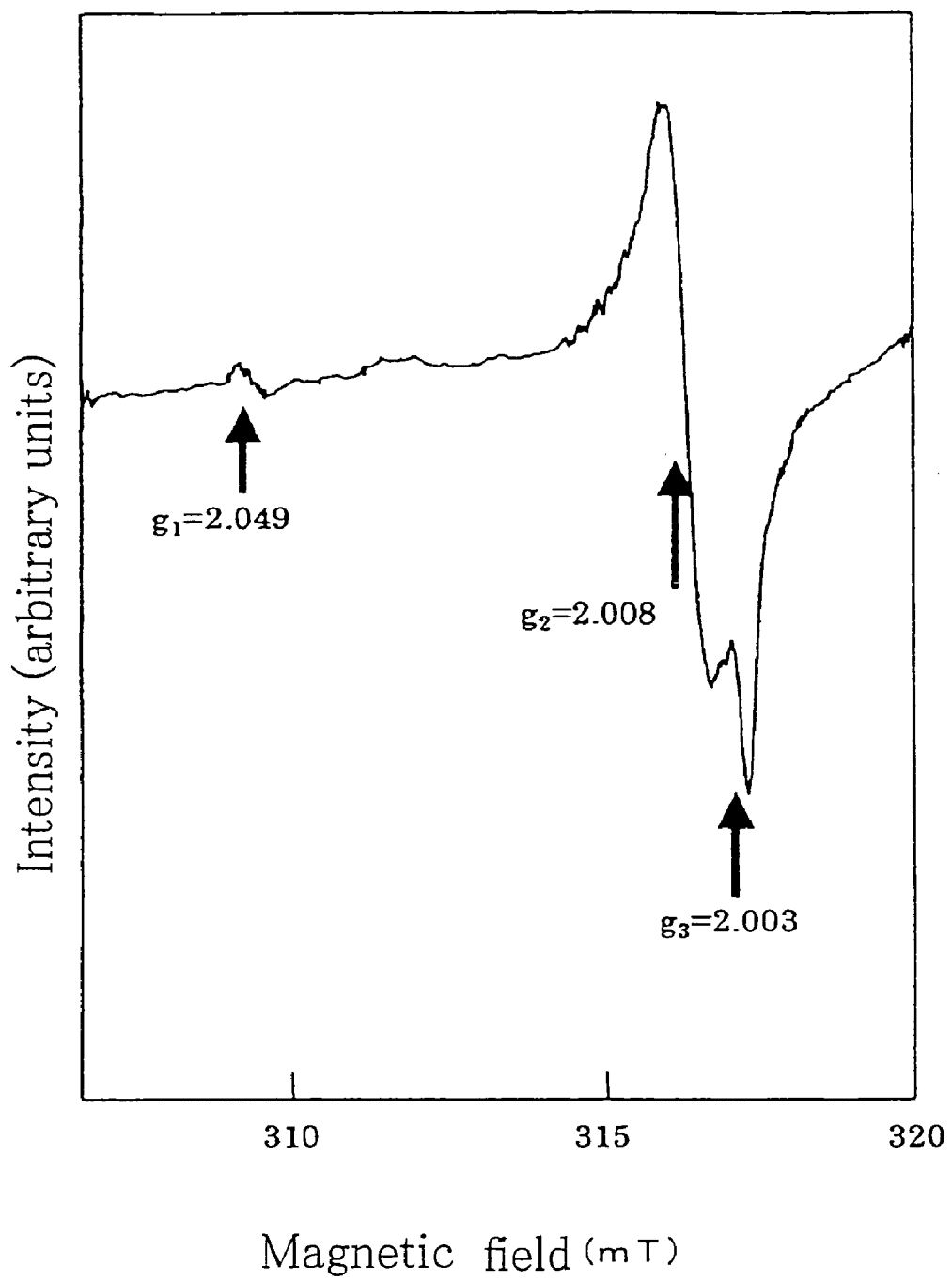
FIG. 1 shows the ESR measurement results for $Ca_{12}Al_{10}Si_4O_{35}$ at room temperature.
Figure 2:
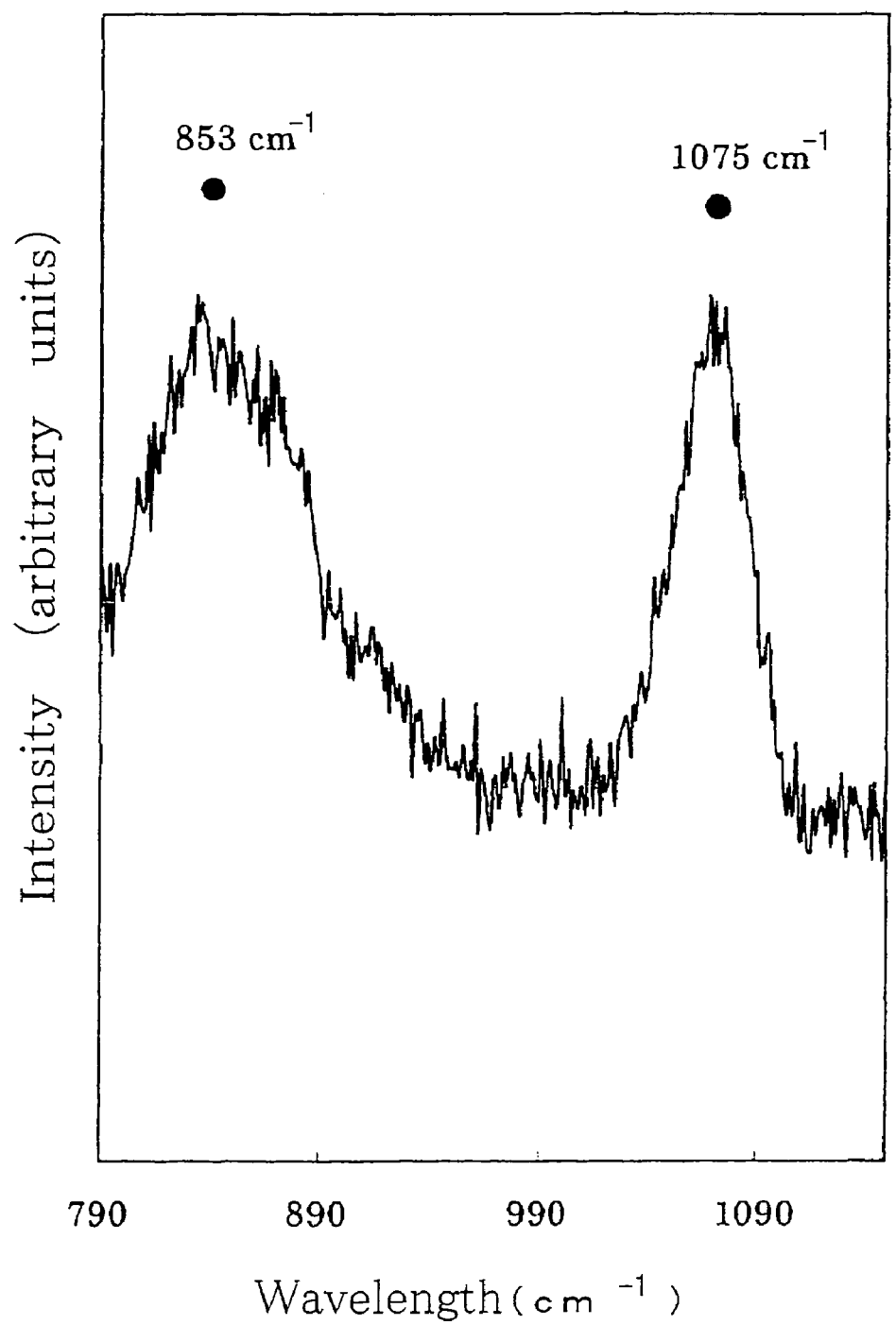
FIG. 2 shows the results of Raman spectroscopy for $Ca_{12}Al_{10}Si_4O_{35}$ at room temperature.
Figure 3:
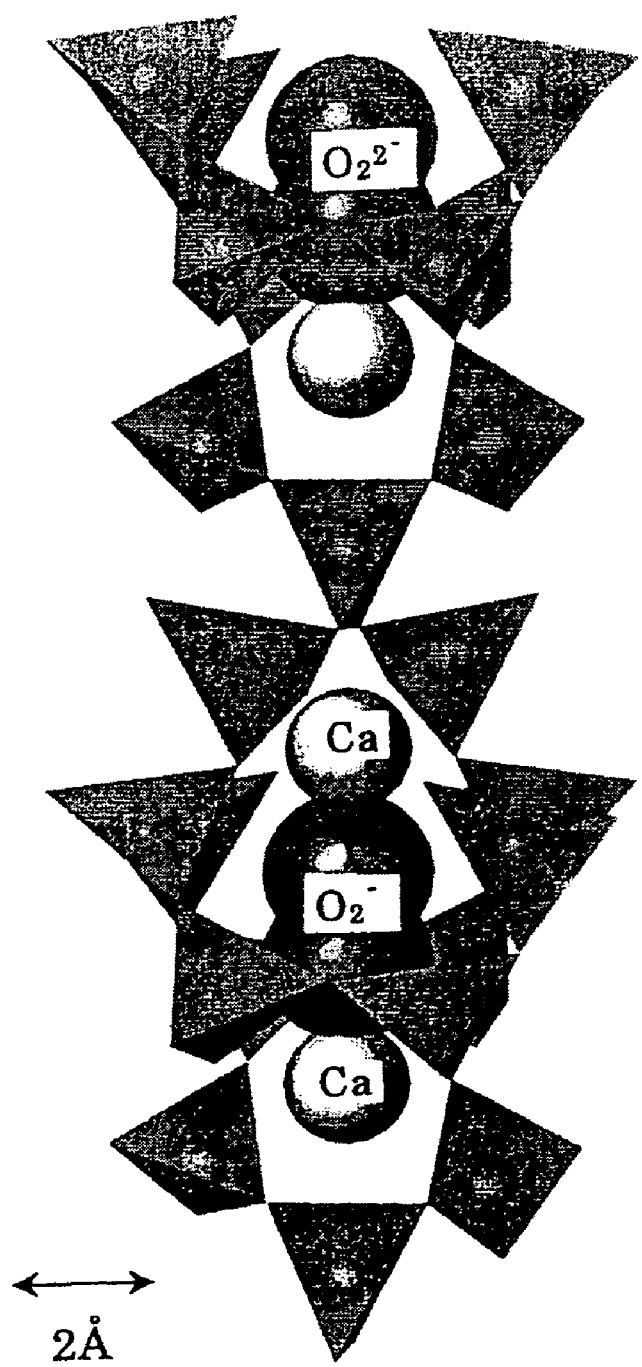
FIG. 3 shows the crystal structure of $Ca_{12}Al_{10}Si_4O_{35}$.

0.77 g of unslaked lime (as a calcia source), 1.8 g of alumina sol (as an alumina source; containing 20% $Al_2O_3$), and 0.21 g of amorphous silica (as a silica source) were weighed out, and water was added to bring the total volume up to 14.6 mL. The mixture (suspension) thus prepared was put in an autoclave with a capacity of 25 mL, and heated for 15 hours at 200° C. while being stirred at 25 rpm. The system was then allowed to cool to room temperature, filtered, and dried, which gave hydrogarnet expressed by the compositional formula $Ca_3Al_2(SiO_4)_{0.8}(OH)_{8.8}$. This hydrogarnet was heated for 5 hours at 700° C. in an electric furnace under an air atmosphere, which gave $Ca_{12}Al_{10}Si_4O_{35}$ (a novel active oxygen developing substance). FIGS. 1 and 2 show the ESR and Raman spectroscopy results at room temperature for the $Ca_{12}Al_{10}Si_4O_{35}$ produced by this method. As discussed above, $Ca_{12}Al_{10}Si_4O_{35}$ was confirmed to include or occlude active oxygen in its structure.

EXAMPLE 2

1.0 g of $Ca_{12}Al_{10}Si_4O_{35}$ that had been molded into pellets with a size of 300 to 500 μm was packed into a quartz glass reaction tube that had been placed in an electric furnace, and the reaction tube temperature was set to the desired temperature between 200 and 900° C. A mixed gas of air and propylene was introduced into the reaction tube at a flux of 100 mL/min. The propylene concentration was 1000 ppm. The outlet gas from the reaction tube was introduced to a gas chromatograph, and the gas was analyzed. No decomposition of propylene was noted between 200 and 375° C., but 2% decomposition was noted at 400° C. The decomposition rate rose along with the reaction temperature, reaching 50% at 500° C., 95% at 550° C., and 100% at over 600° C. The only gases produced by the decomposition of the propylene were $CO_2$ and $H_2O$, indicating that a propylene oxidative decomposition reaction had occurred.

EXAMPLE 3

1.0 g of $Ca_{12}Al_{10}Si_4O_{35}$ that had been molded into pellets with a size of 300 to 500 μm was packed into a quartz glass reaction tube that had been placed in an electric furnace, and the reaction tube temperature was set to the desired temperature between 200 and 900° C. A mixed gas of air and benzene was introduced into the reaction tube at a flux of 100 mL/min. The propylene concentration was 1000 ppm. The outlet gas from the reaction tube was introduced to a gas chromatograph, and the gas was analyzed. No decomposition of benzene was noted between 200 and 400° C., but 3% decomposition was noted at 425° C. The decomposition rate rose along with the reaction temperature, reaching 10% at 450° C., 37% at 500° C., 86% at 550° C., 98% at 600° C., and 100% at over 625° C. The only gases produced by the decomposition of the benzene were $CO_2$, CO, and $H_2O$, indicating that a benzene oxidative decomposition reaction had occurred.

EXAMPLE 4

Figure 4:
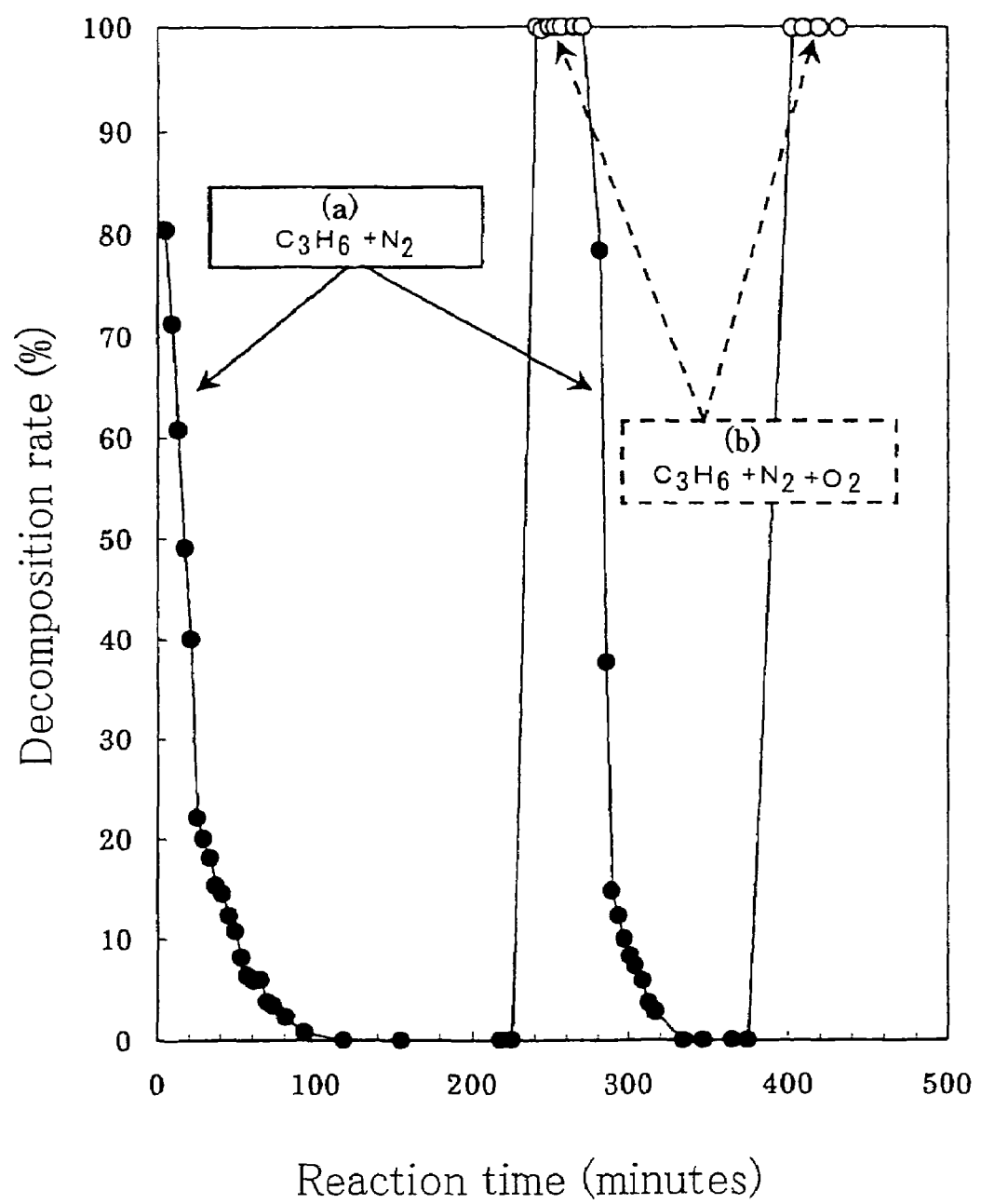
FIG. 4 shows the relationship between reaction time and the propylene decomposition rate under a nitrogen atmosphere (a) using $Ca_{12}Al_{10}Si_4O_{35}$ as the catalyst (air was introduced (b) 220 minutes after the start of the reaction, the active oxygen consumed in the $Ca_{12}Al_{10}Si_4O_{35}$ was regenerated, and the oxidative decomposition of propylene in a nitrogen atmosphere was recommenced)
Figure 7:
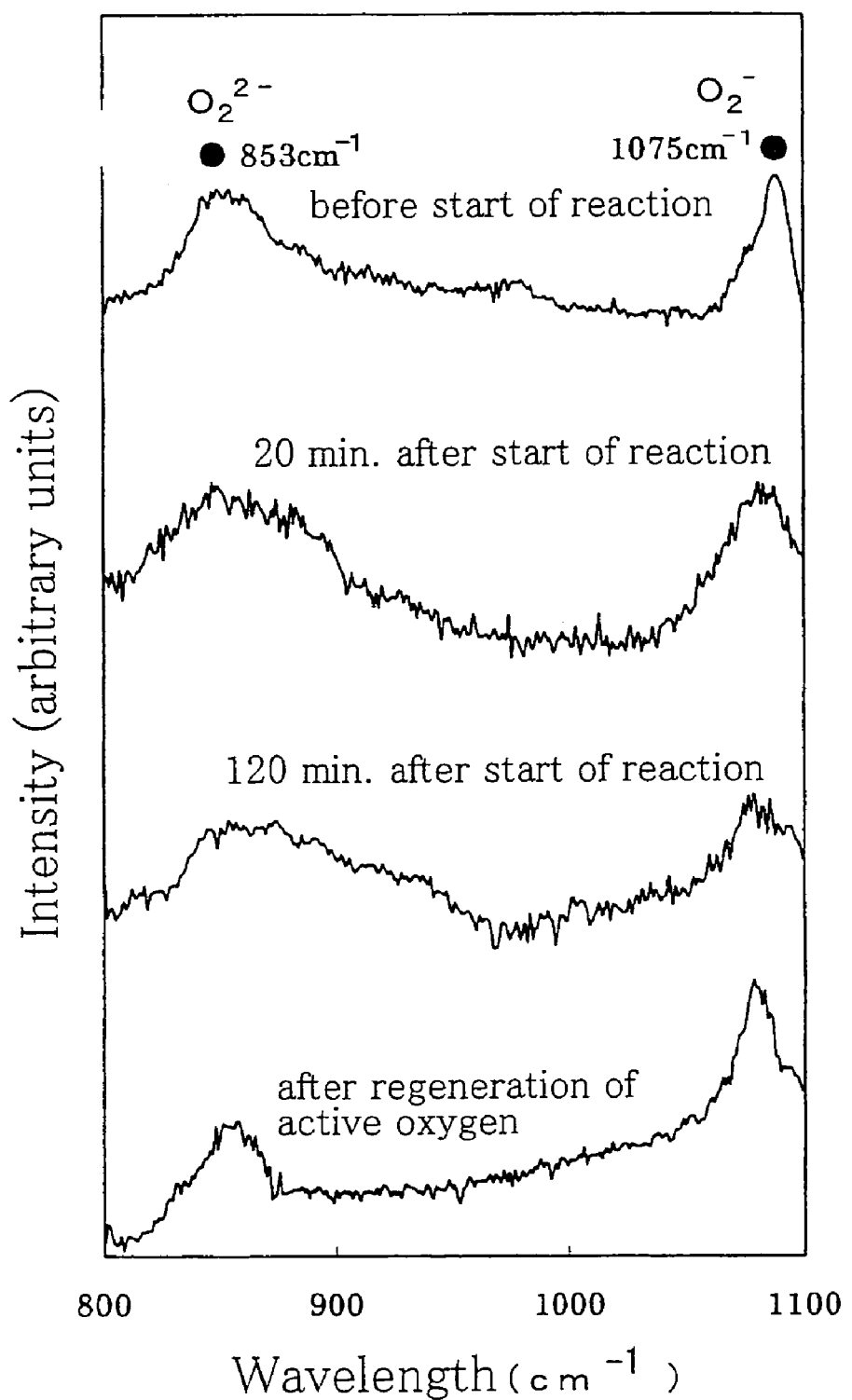
FIG. 7 shows the Raman spectroscopy results for $Ca_{12}Al_{10}Si_4O_{35}$ after a propylene decomposition experiment in a nitrogen atmosphere.
Figure 8:
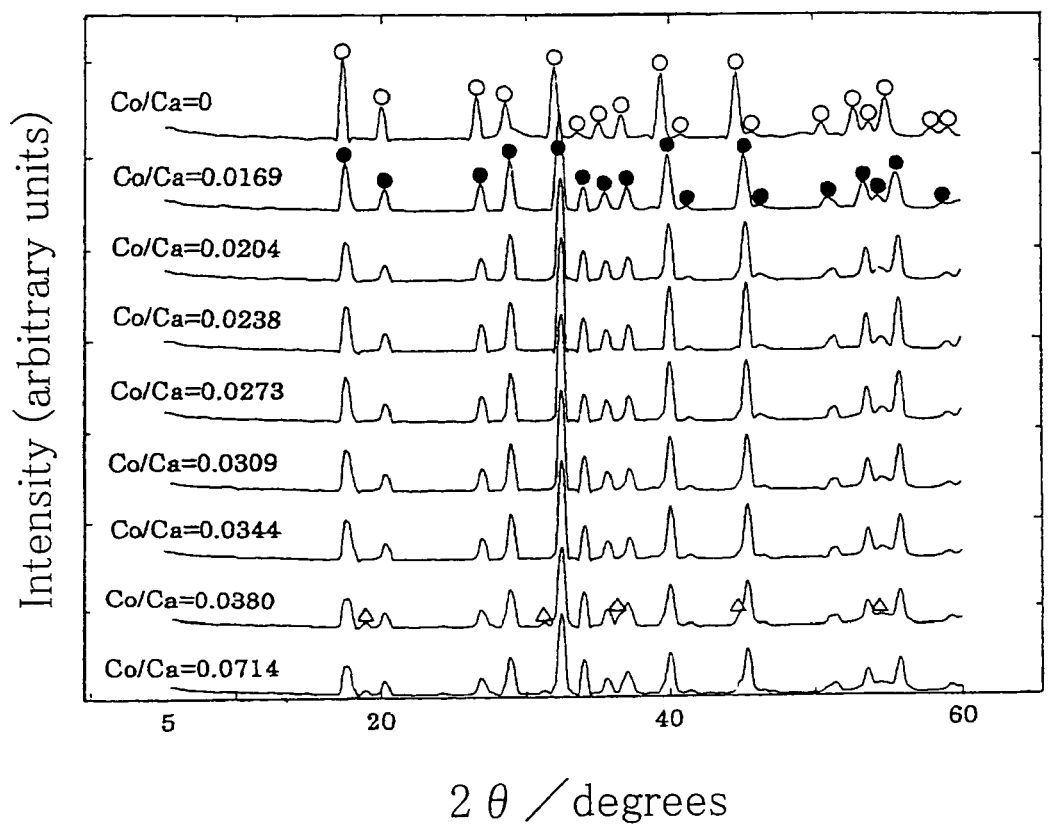
FIG. 8 shows the XRD results for cobalt-containing hydrogarnet synthesized at various Co/Ca ratios from 0 to 0.0714.
Figure 9:
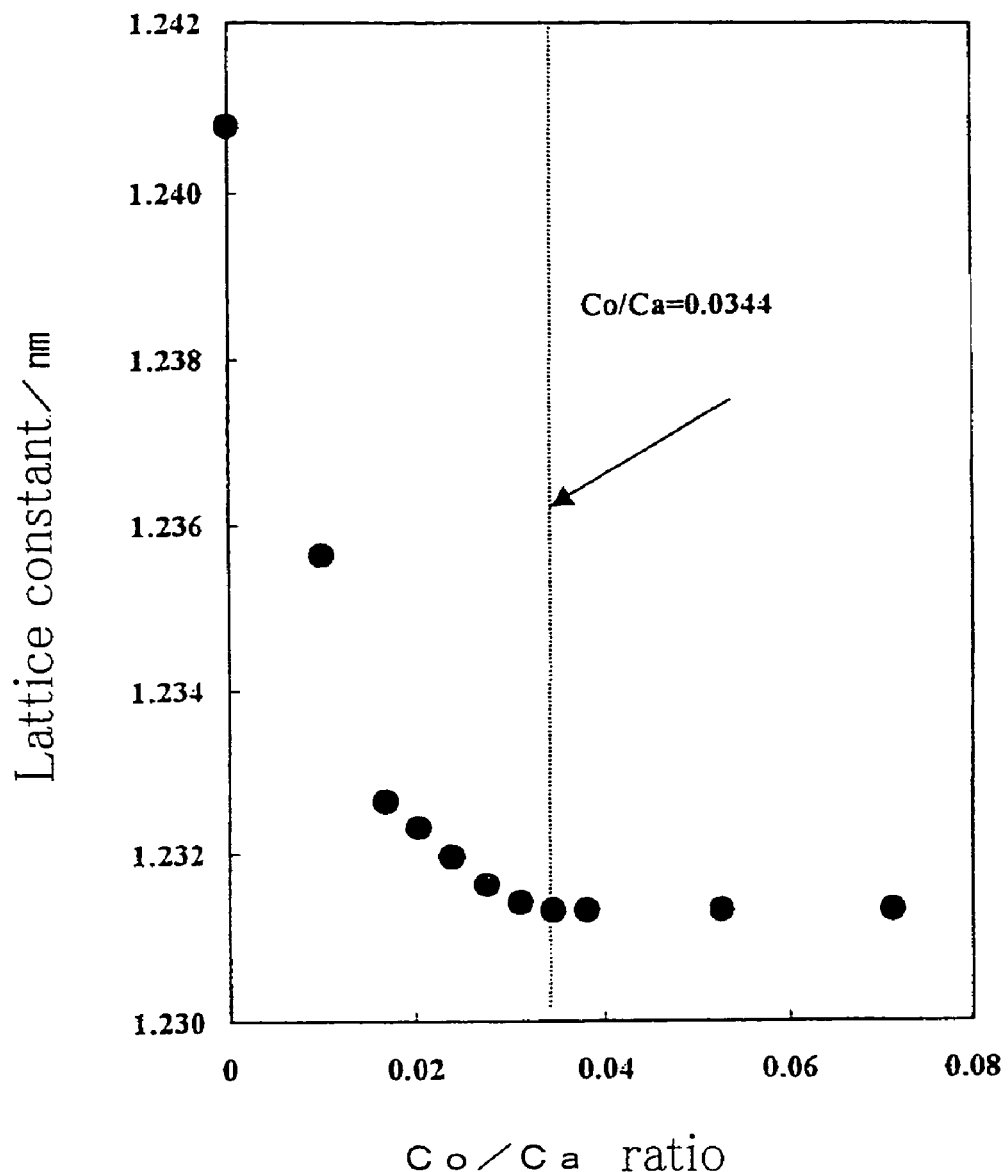
FIG. 9 shows the relationship between lattice constant and Co/Ca ratio for cobalt-containing hydrogarnet synthesized at various Co/Ca ratios from 0 to 0.0714.
Figure 10:
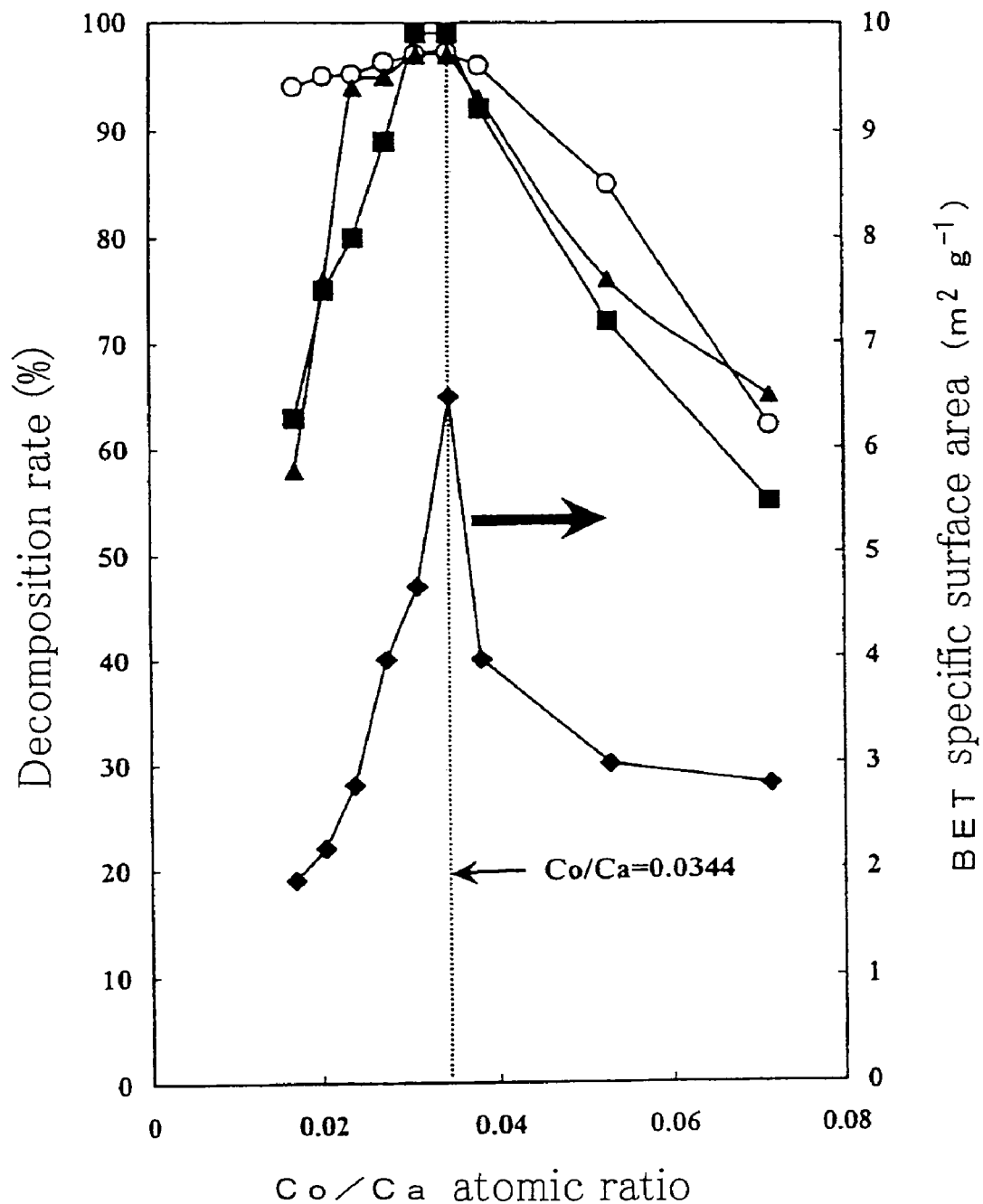
FIG. 10 shows the relationship between the Co/Ca ratio, the specific surface area (black diamonds), and the decomposition rate of various gases (propylene (white circles), benzene (black squares), and toluene (black triangles)) at a reaction temperature of 300° C. when using an aluminosilicate catalyst supporting cobalt oxide.

1.0 g of $Ca_{12}Al_{10}Si_4O_{35}$ that had been molded into pellets with a size of 300 to 500 μm was packed into a quartz glass reaction tube that had been placed in an electric furnace, and the reaction tube temperature was set to 600° C. A mixed gas of nitrogen and propylene was introduced into the reaction tube at a flux of 50 mL/min. The propylene concentration was 100 ppm. The outlet gas from the reaction tube was introduced to a gas chromatograph, and the gas was analyzed. The relationship between propylene decomposition rate and reaction time was measured. These results are shown in FIG. 4. The initial decomposition rate was 80%, but this decreased over time, dropping to 0% after 120 minutes, after which no oxidative decomposition of propylene occurred. FIG. 7 shows the Raman spectroscopy results for the active oxygen in $Ca_{12}Al_{10}Si_4O_{35}$ obtained after propylene decomposition in a nitrogen atmosphere at various reaction times. The active oxygen in the structure decreased as the combustion of the propylene proceeded. Furthermore, it was confirmed that the active oxygen was regenerated in the structure by exposing the $Ca_{12}Al_{10}Si_4O_{35}$ that had lost its active oxygen to air at 400° C. or higher. It was shown that the active oxygen in the lattices consumed by the oxidation reaction was regenerated by taking in oxygen from the air, allowing the propylene to burn continuously.

EXAMPLE 5

$Ca_{12}Al_{10}Si_4O_{35}$ that had been molded into a porous sheet with thickness of 2.0 mm and a diameter of 10 mm was sandwiched between quartz glass reaction tubes with a diameter of 10 mm, this assembly was placed in an electric furnace, and the sample temperature was raised to the desired temperature between 200 and 700° C. A mixed gas of air and propylene was introduced into the reaction tube at a flux of 30 mL/min. The propylene concentration was 500 ppm. The outlet gas from the reaction tube was introduced to a gas chromatograph, and the gas was analyzed. No decomposition of propylene was noted between 200 and 375° C., but 3% decomposition rate was noted at 400° C. The decomposition rate rose along with the reaction temperature, reaching 60% at 500° C. and 100% at over 600° C. The only gases produced by the decomposition of the propylene were $CO_2$ and $H_2O$, indicating that a propylene oxidative decomposition reaction had occurred.

EXAMPLE 6

Measurements were made under the same conditions as in Example 5, but changing the type of gas to methane. Decomposition began at a reaction temperature of 450° C., after which the relationship between methane decomposition rate and reaction temperature was 5% at 500° C., 45% at 600° C., and 100% at 700° C.

EXAMPLE 7

A mix was prepared by mixing 25 weight parts ketjen black (as a conductive material) and 5 weight parts Teflon® (as a binder) into 70 weight parts $Ca_{12}Al_{10}Si_4O_{35}$. The mix was press molded on the surface of an aluminum foil collector with a thickness of 22 μm, producing a sheet with a thickness of 50 μm, and this sheet was then punched out in a diameter of 15 mm to produce a disk-shaped electrode. This electrode was disposed across from a disk of metallic lithium with a thickness of 0.1 mm and a diameter of 15 mm, and a piece of nonwoven cloth with a thickness of 100 μm was disposed as a separator between the electrode and the metallic lithium. A solution produced by dissolving 1 mol of $LiPF_6$ in a mixed solvent of ethylene carbonate and diethyl carbonate (3:7 volumetric ratio) was used for the electrolyte. A cell was produced by sandwiching these components between sheets of Teflon®. Current was allowed to flow into the cell at 0.1 mA/cm² up to 4.5 V, after which the electrode was recovered. The composition of the electrode material was analyzed after the material was washed with diethyl carbonate, which revealed it to be $Li_{30} Ca_{12} (Al_{14-x}Si_x)_{33+0.5x}$.

Next, the second aspect of the present invention will now be described in specific terms by giving examples, but the present invention is not limited in any way by the following examples.

EXAMPLE 8

0.77 g of unslaked lime (as a calcia source), 0.033 g of cobalt hydroxide ($Co(OH)_2$; as a cobalt source), 1.8 g of alumina sol (as an alumina source; containing 20% $Al_2O_3$), and 0.21 g of amorphous silica (as a silica source) were weighed out, and water was added to bring the total volume up to 14.6 mL. The mixture (suspension) thus prepared was put in an autoclave with a capacity of 25 mL, and heated for 15 hours at 200° C. while being stirred at 25 rpm. The system was then allowed to cool to room temperature, filtered, and dried, which gave cobalt-containing hydrogarnet expressed by the compositional formula $(Ca_{2.9}Co_{0.1})Al_2(SiO_4)_{0.8}(OH)_{8.8}$. This cobalt-containing hydrogarnet with the compositional formula of $(Ca_{2.9}Co_{0.1})Al_2(SiO_4)_{0.8}(OH)_{8.8}$ was heated for 5 hours at 400° C., which gave an aluminosilicate catalyst supporting cobalt oxide.

Figure 11:
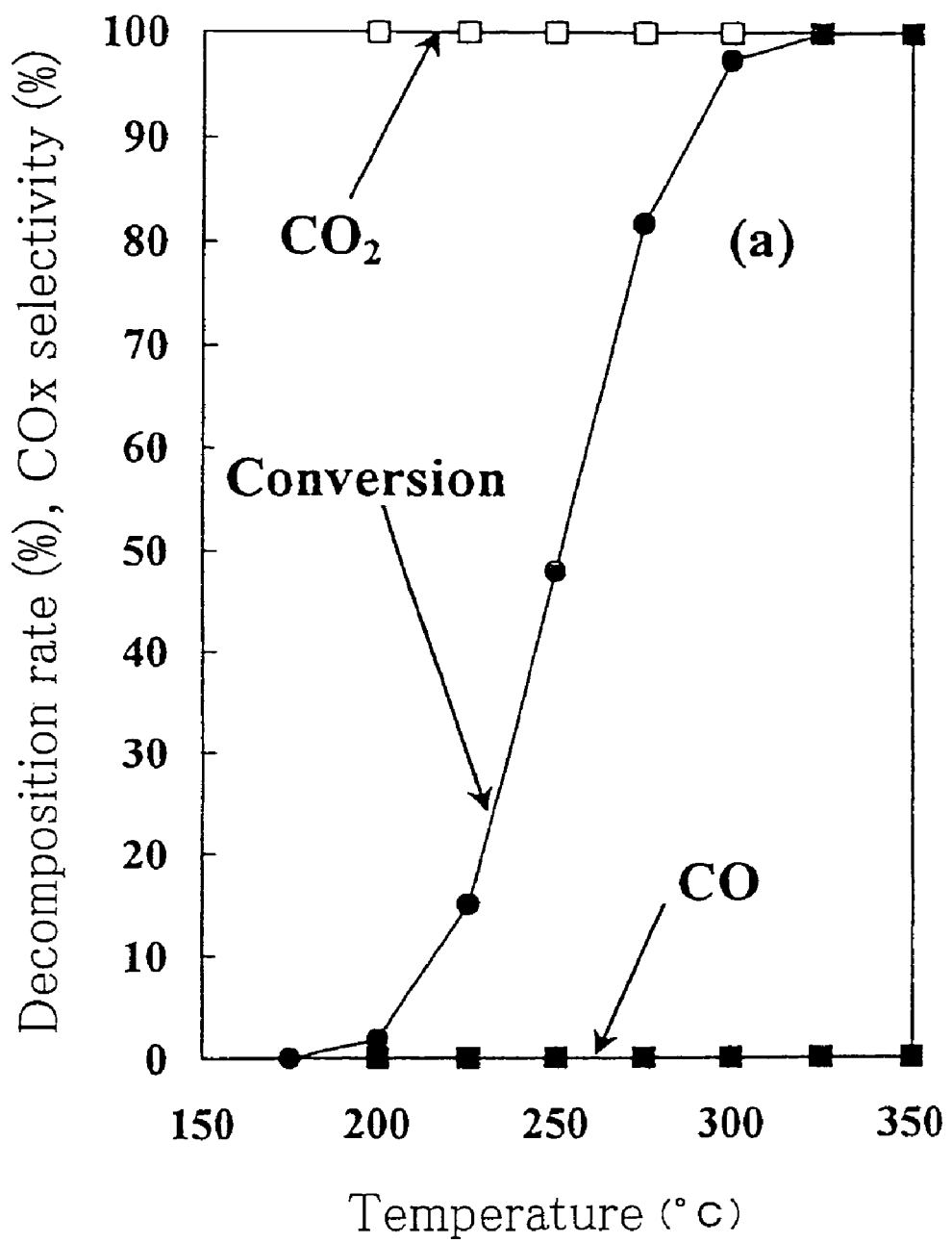
FIG. 11 shows the results of subjecting propylene to oxidative decomposition at various reaction temperatures using $(Ca_{2.9}Co_{0.1})Al_2(SiO_4)_{0.8}(OH)_{8.8}$ as the catalyst.

FIG. 11 shows the results when the oxidative decomposition of propylene was carried out at various reaction temperatures using an aluminosilicate catalyst supporting cobalt oxide. The catalyst reaction experiment was conducted as follows. The reaction apparatus was a normal pressure, compact, fixed bed, flow through type, the catalyst particle size was 300 to 500 μm, the reaction temperature was from room temperature to 500° C., the reaction gas concentration was 1000 ppm, the flow-through gas was air, the gas flux was 100 mL/min, the space velocity was 10,000 $h^{-1}$, and gas analysis was performed by gas chromatography (packing material: Porapak P, 5A molsieve, activated carbon, column: 2 m×3). As a result, the decomposition rate was 2% at a reaction temperature of 200° C., but the decomposition rate rose along with temperature, reaching 100% at 325° C. The product after decomposition was only $CO_2$. $H_2O$ was produced, but was not analyzed.

EXAMPLE 9

Figure 14:
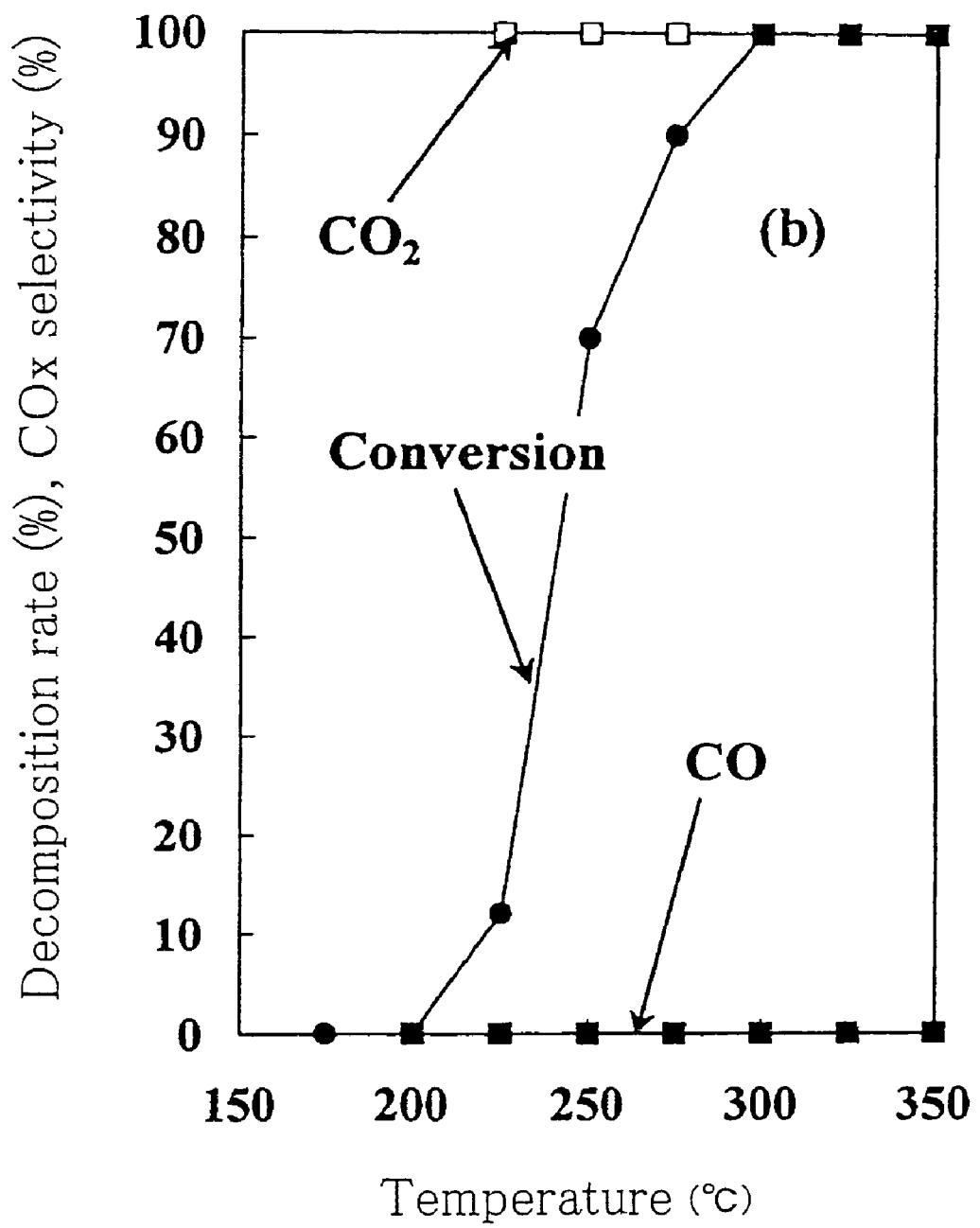
FIG. 14 shows the results of subjecting benzene to oxidative decomposition at various reaction temperatures using $Ca_{2.9}Co_{0.1})Al_2(SiO_4)_{0.8}(OH)_{8.8}$ as the catalyst.

A catalyst experiment was conducted by the same method as in Example 8, using an aluminosilicate catalyst supporting cobalt oxide prepared by the same method as in Example 8. FIG. 14 shows the results of subjecting benzene to oxidative decomposition at various reaction temperatures. The decomposition rate was 0% at a reaction temperature of 200° C. and 13% at 225° C., but the decomposition rate rose along with temperature, reaching 100% at 300° C. The product after decomposition was only $CO_2$. $H_2O$ was produced, but was not analyzed.

EXAMPLE 10

Figure 15:
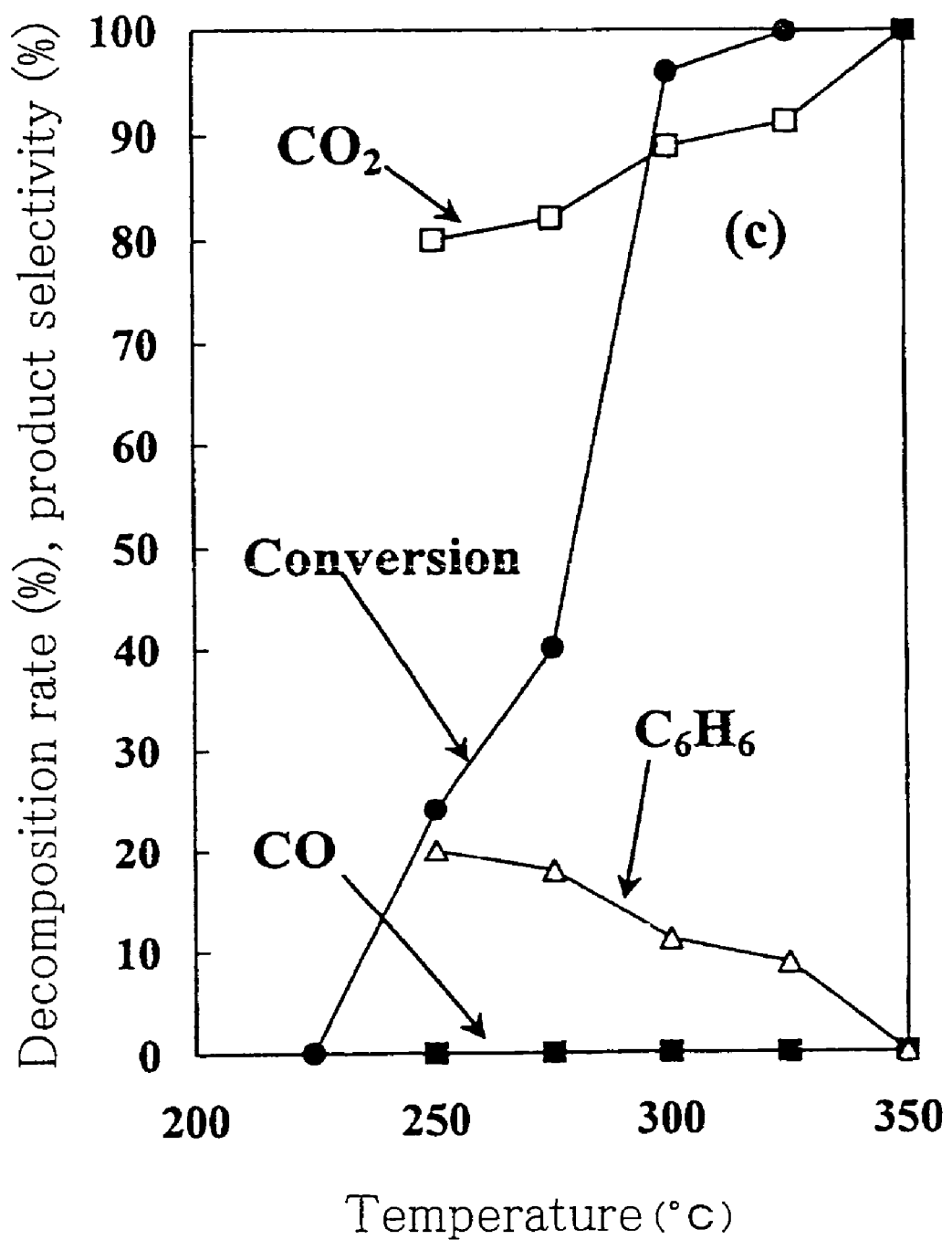
FIG. 15 shows the results of subjecting toluene to oxidative decomposition at various reaction temperatures using $Ca_{2.9}Co_{0.1})Al_2(SiO_4)_{0.8}(OH)_{8.8}$ as the catalyst.

A catalyst experiment was conducted by the same method as in Example 8, using an aluminosilicate catalyst supporting cobalt oxide prepared by the same method as in Example 8. FIG. 15 shows the results of subjecting toluene to oxidative decomposition at various reaction temperatures. The decomposition rate was 0% at a reaction temperature of 225° C. and 25% at 250° C., but the decomposition rate rose along with temperature, reaching 100% at 325° C. The products after decomposition were $CO_2$ and benzene. $H_2O$ was produced, but was not analyzed.

INDUSTRIAL APPLICABILITY

As detailed above, the present invention relates to an aluminosilicate having a zeolite-like structure in which active oxygen (superoxide: $O_2^-$, peroxide: $O_2^{2-}$) is encapsulated, that is, a novel active oxygen developing substance, and to a molded article of this substance. The active oxygen included or occluded in the structure of this substance induces hydrocarbon oxidation reactions (such as epoxidation, complete oxidation, partial oxidation, and coupling), and the novel active oxygen developing substance of the present invention can be utilized in a wide range of technological fields dealing with the environment, energy, the chemical industry (manufacturing process), and so forth. Further, a molded article of inorganic compound of the present invention is useful, for example, as an exhaust gas purification catalyst for two-wheeled vehicles, a solid electrolyte for secondary cells, an oxygen occlusion carrier, or the like.

The present invention further relates to an aluminosilicate catalyst supporting cobalt oxide, and to a method for manufacturing this catalyst, and the present invention provides a catalyst with higher activity than conventional oxidation or combustion catalysts. The action of the active oxygen included or occluded in the structure of the aluminosilicate results in a higher oxidation capability at lower temperatures than conventional catalysts. An aluminosilicate catalyst supporting cobalt oxide can be manufactured by a simple process under lower temperature conditions (at least 300° C. and no higher than 1000° C.). This catalyst is useful as a way to oxidatively decompose volatile organic compounds and the like.

The inventioned claimed is:

1. An inorganic compound that has an active oxygen developing mechanism and includes or occludes active oxygen,
    the inorganic compound includes or occludes both a superoxide anion ($O_2-$) and a peroxide anion ($O_2^{2-}$),
    wherein the inorganic compound is an aluminosilicate obtained by the pyrolysis of hydrogarnet, and wherein the compositional formula of the aluminosilicate is $Ca_{12}(Al_{14-X}Si_X)O_{33+0.5X}$, where the value of X is in the range of $0<X\leqq4$.

2. A method for manufacturing the inorganic compound defined in claim 1, wherein an aluminosilicate having an active oxygen developing mechanism is manufactured by heating hydrogarnet at no lower than 700° C. and no higher than 1200° C. and wherein the compositional formula of the hydrogarnet is $Ca_3Al_2(SiO_4)_{3-Y}(OH)_{4Y}$, where the value of Y is in the range of $0\leqq Y<3$.

3. An oxidation catalyst composed of the inorganic compound according to claim 1 or a molded article thereof.

4. A member composed of a molded article of the inorganic compound according to claim 1.

5. The member according to claim 4, wherein the member is an exhaust gas purification catalyst.

6. The member according to claim 4, wherein the member is a solid electrolyte.

7. The member according to claim 4, wherein the member is an oxygen occlusion carrier.

8. An aluminosilicate catalyst supporting cobalt oxide, which is an oxidation or combustion catalyst containing as a constituent component an aluminosilicate that includes or occludes active oxygen in its structure, wherein the cobalt oxide is carried on the aluminosilicate surface and wherein the aluminosilicate has a compositional formula of $Ca_{12}(Al_{14-X}Si_X)O_{33+0.5X}$, where the value of X is in the range of $0\leqq X\leqq4$.

9. A method for manufacturing the aluminosilicate catalyst supporting cobalt oxide according to claim 8, wherein cobalt-containing hydrogarnet is decomposed by heating and wherein the cobalt-containing hydrogarnet has a compositional formula of $(Ca_{3-Y}CO_Y)Al_2(SiO_4)_{3-Z}(OH)_{4Z}$, where the value of Y is in the range of $0<Y\leqq0.1$, and Z in the range of $0\leqq Z\leqq2.2$.

10. The method for manufacturing an aluminosilicate catalyst supporting cobalt oxide according to claim 9, wherein the cobalt-containing hydrogarnet is heated at no lower than 300° C. and no higher than 1000° C.

11. A member composed of a molded article of the cobalt oxide aluminosilicate catalyst according to claim 8.

12. The member according to claim 11, wherein the member is an exhaust gas purification catalyst for a two-wheeled vehicle.

13. The member according to claim 11, wherein the member is a combustion exhaust gas purification catalyst.

14. The member according to claim 11, wherein the member is an oxygen occlusion member.

* * * * *